United States Patent [19]
Suzuki et al.

[11] Patent Number: 5,604,004
[45] Date of Patent: Feb. 18, 1997

[54] OPTICAL RECORDING MEDIUM USING FORMAZAN METAL COMPLEX DYE AND PHOTO-STABILIZING METHOD

[75] Inventors: Takahiko Suzuki; Masahiro Shinkai, both of Chiba; Kenryo Namba, Tokyo, all of Japan

[73] Assignee: TDK Corporation, Tokyo, Japan

[21] Appl. No.: 538,353

[22] Filed: Oct. 3, 1995

[30] Foreign Application Priority Data

Feb. 27, 1995 [JP] Japan ................................. 7-63352
Apr. 5, 1995 [JP] Japan ................................. 7-104806

[51] Int. Cl.$^6$ ................................................. B32B 3/00
[52] U.S. Cl. ..................... 428/641; 428/64.2; 428/64.4; 428/64.8; 428/913; 430/541; 430/945; 430/270.11; 369/283; 369/288
[58] Field of Search .............................. 428/64.1, 64.2, 428/64.4, 64.8, 913; 430/270, 271, 495, 945; 369/283, 288

[56] References Cited

U.S. PATENT DOCUMENTS

| | | | |
|---|---|---|---|
| 5,024,923 | 6/1991 | Suzuki et al. | 430/372 |
| 5,294,471 | 3/1994 | Evans et al. | 428/64 |
| 5,389,419 | 2/1995 | Maeda et al. | 428/64 |

FOREIGN PATENT DOCUMENTS

| | | |
|---|---|---|
| 62-144997 | 6/1987 | Japan . |
| 3-268994 | 11/1991 | Japan . |
| 6-6394 | 1/1994 | Japan . |
| 6-71825 | 9/1994 | Japan . |
| 6-104778 | 12/1994 | Japan . |
| 7-5848 | 1/1995 | Japan . |
| 7-3173 | 1/1995 | Japan . |
| 7-3174 | 1/1995 | Japan . |

OTHER PUBLICATIONS

Nikkei Electronics, No. 465, Jan. 23, 1989, p. 107.
The Functional Dye Department of the Kinki Chemical Society, Mar. 3, 1989, pp. 15–20.
Spie, vol. 1078, Optical Data Storage Topical Meeting, 1989, pp. 80–87, E. Hamada, et al., "CD–Compatible Write–Once Disc with High Refrectivity".
Japan Analyst Cemetery, vol. 16, pp. 1364–1369, 1967.
Analytical Sciences, vol. 7, Feb. 1991, pp. 119–124, Akira Uchiumi, et al., "Reaction of Pyridylformazane Derivatives with Transition Metal Ions".
Analytical Sciences, vol. 7, Jun. 1991, pp. 459–462, Akira Uchiumi, et al., "Metal Complex Formation of Some Anthryl Formazans".
The Chemical Society of Japan, vol. 8, May 8, 1968, pp. 776–779, Akira Uchiumi, et al., "Color Reaction of 2–Carboxy–2'–Methoxy–5'–Sulfoformazylbenzene and Metal Ions".
The Chemical Society of Japan, Apr. 3, 1969, pp. 1133–1137, Akira Uchiumi, "Color Reaction of 1,3–Diphenyl–5–(2–Thiazolyl) Formazan and Metal Ions".
The Chemical Society of Japan, No. 4, 1983, pp. 513–517, Akira Uchiumi, "Formation Constants of Cobalt(II), Nickel(II), Copper(II), and Palladium(II) Chelates of 2–[1–(2–Methoxy–5–Sulfophenyl)–3–Phenyl–5–Formazano]–Benzoic Acid and the Application to the Spectrophotometric Determination of Copper(II)".

(List continued on next page.)

*Primary Examiner*—Patrick J. Ryan
*Assistant Examiner*—Elizabeth Evans
*Attorney, Agent, or Firm*—Oblon, Spivak, McClelland, Maier & Neustadt, P.C

[57] ABSTRACT

A formazan metal complex dye is contained as a light absorbing dye in a recording layer to construct an optical recording medium. The formazan metal complex dye has high solubility and a relatively-low thermal decomposition temperature and the recording medium exhibits high sensitivity, especially high recording sensitivity, and improved light resistance. The formazan metal complex dye can be used as a photo-stabilizer in an optical recording medium. The formazan metal complex dye is also effective for stabilizing conventional dyes against light.

10 Claims, 3 Drawing Sheets

OTHER PUBLICATIONS

Japan Analyst, vol. 21, 1972, pp. 578–586, Akira Kawase, "Formazan".

Trace Metal Metabolism, vol. 16,, 1988, pp. 145–150, Akira Uchiumi, et al., "Multielement Analysis by Metal Chelation(V) Reaction of a Water–Soluble Heterocyclic Formazyl Derivative with Metal Ions".

Trace Metal Metabolism, vol. 6, 1988, pp. 151–155, Ayako Tanaka, et al., "Reaction of Analogoues of Zincon with Trace Metal Ions".

OPTICAL RECORDING MEDIUM USING FORMAZAN METAL COMPLEX DYE AND PHOTO-STABILIZING METHOD

BACKGROUND OF THE INVENTION

1. Field of the Invention

This invention relates to an optical recording medium using a formazan metal complex dye in a recording layer and a method for photo-stabilizing a dye.

2. Prior Art

In recent years, optical recording discs of the write-once, rewritable or erasable and other types have been of great interest as high capacity information carrying media. Some optical recording discs use a dye film composed mainly of a dye as their recording layer. From a structural aspect, commonly used optical recording discs are classified into an air-sandwich structure type having an air space on a dye base recording layer and a close contact type having a reflective layer in close contact with a dye base recording layer. The latter has the advantage of enabling readout in accordance with the compact disc (CD) standard. For instance reference is made to Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pp. 80–87, "Optical Data Storage Topical Meeting", 17–19, January 1989, Los Angels.

The dyes used in such recording layers must be chemically stable and resistant to light. Since the recording layer is generally formed by spin coating from the manufacturing and cost points of view, the dyes must also have a sufficient solubility in certain solvents to form a coating solution. With respect to these requirements, phthalocyanine dyes are believed preferable for chemical stability and light resistance. However, the phthalocyanine dyes are substantially insoluble in most organic solvents and thus impractical unless they are subject to a solubilizing treatment as by introducing a substituent to convert into a soluble structure. They also have the disadvantages of a less variable wavelength range and an increased cost of manufacture.

Several metal complex dyes are known to meet the requirements of chemical stability and light resistance. For example, azo metal complex dyes are disclosed in Japanese Patent Application Kokai (JP-A) No. 268994/1991 and bidentate formazan nickel complex dyes are disclosed in JP-A 254038/1985 and 144997/1987. The metal complex dyes are fully resistant to light, but generally have low recording sensitivity and relatively low solubility. They are soluble only in selected solvents. Another problem is crystallization occurring in a spin coated film. The bidentate formazan nickel complex dyes have a somewhat longer absorption wavelength and are deemed rather impractical when the wavelength (780 nm) of a semiconductor laser currently utilized for recording and readout of optical discs is taken into account. Since it is essential to shorten the wavelength of laser light for the advanced higher density recording technology under development, there is a strong demand to have a dye skeleton capable of meeting such a requirement too.

As is well known in the art, cyanine dyes are widely used in recording layers. The cyanine dyes are advantageous with respect to optical properties, solubility and manufacture cost, but extremely less resistant to light because of the sensitization action of singlet oxygen. As a general rule, photo-stabilizers are combined therewith. Typical photo-stabilizers are metal complexes such as nickel complexes of bis(phenylenedithiol). These metal complexes function as singlet oxygen quenchers while degradation of the complexes themselves and low solubility due to their plane configuration are problems. Also undesirably, their preparation is accompanied by disgusting smell and an increased cost.

SUMMARY OF THE INVENTION

Therefore, a primary object of the present invention is to provide an optical recording medium which uses a formazan metal complex dye having good solubility and an appropriate thermal decomposition temperature and which features high sensitivity, especially high recording sensitivity, light resistance, high reflectance over a wide wavelength range, can accommodate laser light of the current wavelength and the future shorter wavelength, and is stable against variations and drifts of the oscillation wavelength of a laser.

Another object of the present invention is to provide an optical recording medium which uses a light-absorbing dye and a formazan metal complex dye as a photo-stabilizer therefor and which is resistant to light, easy to manufacture, typically easy to coat a recording layer, and excellent in performance.

A further object of the present invention is to provide a method for stabilizing dyes, typically light-absorbing dyes against light to effectively prevent their photo-degradation.

According to a first aspect of the present invention, there is provided an optical recording medium having a recording layer comprising at least one dye selected from formazan metal complex dyes of the following general formulae (I) and (II).

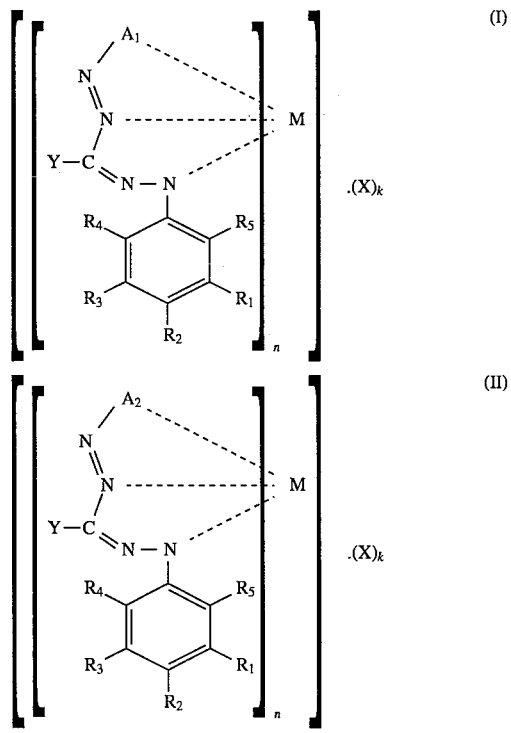

The symbols in formulae (I) and (II) have the following meaning.

M is a divalent metal atom.

$A_1$ is a group represented by

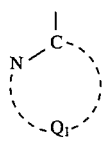

wherein $Q_1$ is a group of atoms necessary to form with C and N a five or six-membered heteroaromatic ring which may have fused ring.

$A_2$ is a group represented by $A_{21}$ or $A_{22}$:

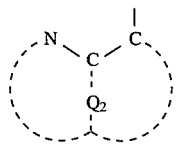

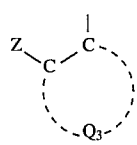

wherein $Q_2$ is a group of atoms necessary to form with C and N a nine of ten-membered heteroaromatic ring which may have a fused ring, $Q_3$ is a group of atoms necessary to form with C a five or six-membered heteroaromatic ring or benzene ring which may have a fused ring, Z is selected from the group consisting of an oxy (—O—), thio (—S—), imino (—NH—), oxycarbonyl (—O—CO—), iminocarbonyl (—NH—CO—), and iminosulfonyl (—NH—SO$_2$—) group, each of $A_1$, $A_{21}$ and $A_{22}$ at its C is attached to N in the formazan skeleton, each of $A_1$ and $A_{21}$ at its N coordinates to M, and $A_{22}$ at its Z coordinates to M.

Y is selected from the group consisting of an aromatic, alkyl, acyl, alkoxycarbonyl, cyano, nitro, alkoxy and alkylthio group.

$R_1$, $R_2$, $R_3$, $R_4$, and $R_5$ are independently selected from the group consisting of a hydrogen atom, alkyl group, alkoxy group, nitro group, cyano group, halogen atom, aryl group, aryloxy group, acyl group, alkoxycarbonyl group, carbamoyl group, and amino group, at least one of $R_4$ and $R_5$ is a hydrogen atom.

Letter n representing the number of formazan ligands coordinating to M is equal to 1 or 2. X is a counter ion to the formazan metal complex. Letter k is a number necessary to provide a balance of electric charge. The broken lines in formulae (I) and (II) represent coordinate bonds to M.

Several preferred embodiments are described below. M is Fe, Co, Ni, Cu, Zn, or Pd. The five or six-membered heteroaromatic ring which is formed by $Q_1$ in $A_1$ is a pyridine, thiazole, benzothiazole, oxazole, benzoxazole, or isoquinoline ring. The nine or ten-membered heteroaromatic ring which is formed by $Q_2$ in $A_{21}$ is a quinoline ring. The ring formed by $Q_3$ in $A_{22}$ is a benzene ring. $A_1$ or $A_{21}$ is preferred in a dye of formula (I) or a dye of formula (II).

The formazan metal complex dye is preferably of the following general formula (III).

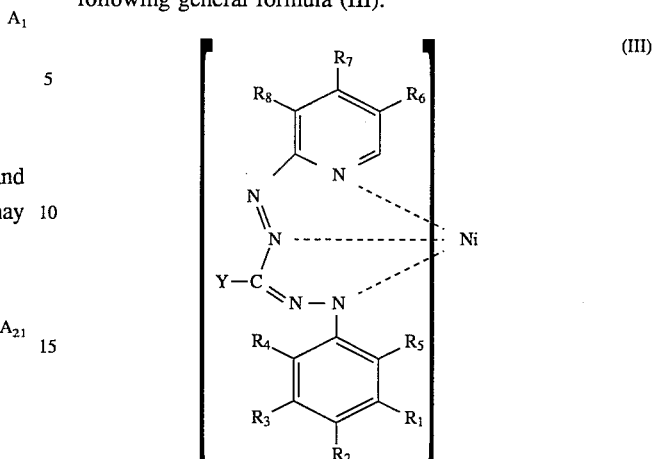

Y and $R_1$ to $R_5$ are as defined above; $R_6$, $R_7$, and $R_8$ are independently selected from the group consisting of a hydrogen atom, halogen atom, nitro group, alkyl group, and cyano group; and the broken lines in formula (III) represent coordinate bonds to Ni.

In another preferred embodiment, the recording layer further contains a light absorbing dye which is typically a cyanine dye. In a second aspect, the invention provides a method for photo-stabilizing a dye with a formazan metal complex dye of formula (I) or (II).

FUNCTION AND ADVANTAGES

The formazan metal complex dye used herein has a formazan ligand of one molecule coordinated to the center metal atom M at three points as shown by formulae (I) and (II). The tridentate ligand affords relatively great steric hindrance as compared with the metal complexes of JP-A 254038/1985 and 144997/1987 in which two formazan ligands coordinate to nickel each at two points to form a fully symmetrical, four-coordinate, substantially plane tetragonal structure. More particularly, where two formazan ligands coordinate to the center metal atom each at three points to form a six-coordinate octahedral structure, this structure has the formazan ligands crossed with each other, resulting in enhanced steric hindrance. Where a single formazan ligand coordinates to the center metal atom at three points to form a four-coordinate metal complex with another ligand, there results a tetrahedral structure or a plane tetragonal structure. Based on the structure of the formazan ligand, the formazan metal complex dye used in the present invention is expected to assume a structure approximate to a plane tetragonal structure. The formazan metal complex dye assuming such a structure loses symmetry and is rich in steric hindrance as compared with the complex wherein bidentate ligands form a plane tetragonal structure.

As a consequence, the formazan metal complex dye of the invention is improved in solubility to enable easy formation of a coating film and has an appropriate heat decomposition temperature and high sensitivity when used as a light-absorbing dye in a recording layer of an optical recording medium. Since the inventive dye has a high coefficient of light absorption, its thin film has a high refractive index satisfying the properties required from the recording principle. Since the inventive dye has high reflectance over a wide wavelength range, it can accommodate to not only the currently available optical recording media, but also future optical recording media adapted for higher density and shorter wavelength recording. The inventive dye experiences minimal change of its properties by variations and drifts of the oscillation wavelength of a laser. When a dye film serving as a recording layer is formed from the inventive dye, its properties depend only a little on film thickness and other factors, allowing a film to be formed without undue care. Light resistance is high. Synthesis of the inventive dye is relatively easy.

The formazan metal complex dye of the invention has the function of a photo-stabilizer as well as the function of a light-absorbing dye. More particularly, since the inventive dye effectively traps the light energy the co-existing light-absorbing dye has absorbed through energy transfer and thermally deactivates or quenches this energy without giving it to oxygen molecules or the like, the inventive dye substantially restrains the sensitization action of singlet oxygen on the co-existing light-absorbing dye, thereby stabilizing the light-absorbing dye. Then by using the formazan metal complex dye as a photo-stabilizer in a recording layer along with a light-absorbing agent, there is obtained an optical recording medium having improved light resistance and satisfactory performance.

The action of the formazan metal complex dye as a photo-stabilizer is effective to not only light-absorbing dyes as used in the recording layer of optical recording media, but also ordinary dyes for preventing photo-degradation thereof.

Also the formazan metal complex dye of the invention is effective in small amounts since its function as a photo-stabilizer is extremely strong.

It is to be noted that cyanine dyes are conventionally used in the recording layer of optical recording media and metal complexes of bis(phenylenedithiol) serving as single oxygen quenchers are used as photo-stabilizers to compensate for the low light resistance of cyanine dyes. These metal complexes, however, are less soluble and tend to lower their function as a singlet oxygen quencher, losing the function of a photo-stabilizer. In contrast, the formazan metal complex dye of the invention eliminates these problems. An optical recording medium using the formazan metal complex dye of the invention affords superior electrical properties to media using conventional metal complexes of bis(phenylenedithiol).

BEST MODE FOR CARRYING OUT THE INVENTION

Figure 1:
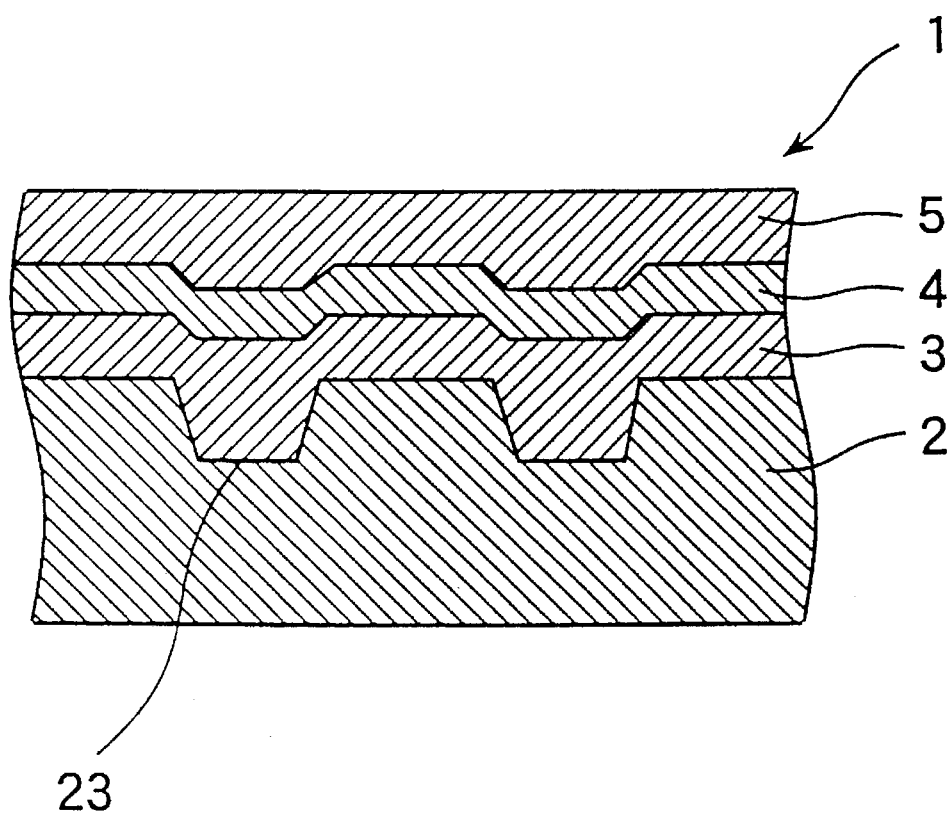
FIG. 1 is a cross-sectional view of a portion of an optical recording disc according to one embodiment of the invention.

The formazan metal complex dyes used in the present invention are represented by formulae (I) and (II).

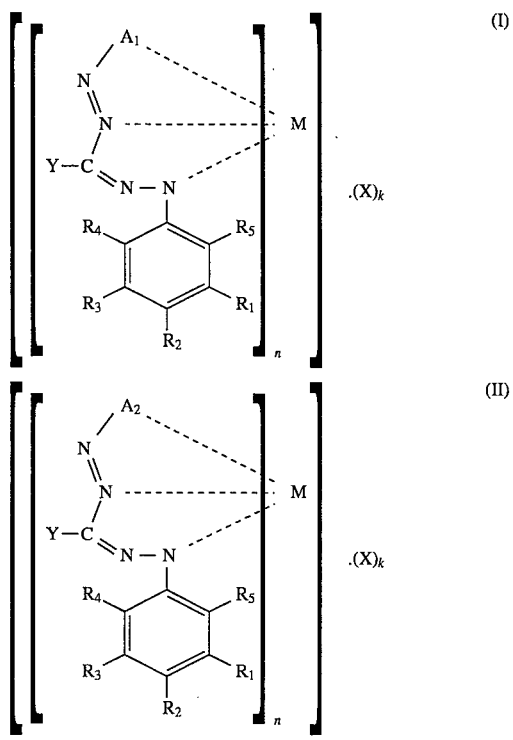

M is a divalent metal atom, for example, Fe, Co, Ni, Cu, Zn, and Pd, preferably Ni, Cu, and Zn, with Ni being most preferred.

In formula (I), $A_1$ is a group represented by

wherein $Q_1$ is a group of atoms necessary to form a five or six-membered heteroaromatic ring with the carbon and nitrogen atoms. The heteroaromatic ring may further have a fused ring. Examples of the heteroaromatic ring which may have a fused ring include nitrogenous heteroaromatic rings such as pyridine, thiazole, benzothiazole, oxazole, benzoxazole, and isoquinoline rings, with the pyridine and isoquinoline rings being preferred, especially the pyridine ring.

In formula (II), $A_2$ is a group represented by $A_{21}$ or $A_{22}$:

In $A_{21}$, $Q_2$ is a group of atoms necessary to form a nine or ten-membered heteroaromatic ring with the carbon and nitrogen atoms. The heteroaromatic ring may further have a fused ring. The heteroaromatic ring which may have a fused ring is a quinoline ring, for example.

In $A_{22}$, $Q_3$ is a group of atoms necessary to form a five or six-membered heteroaromatic ring or benzene ring with the carbon atoms. These rings may further have a fused ring. Among them, the heteroaromatic ring which may have a fused ring is as exemplified above in conjunction with $A_1$ and $A_{21}$. Examples of the benzene ring which may have a fused ring include benzene, naphthalene and anthracene rings, with the benzene ring being preferred.

Z represents a divalent group containing an atom coordinating to M and is an oxy (—O—), thio (—S—), imino (—NH—), oxycarbonyl (—O—CO—), iminocarbonyl (—NH—CO—), or iminosulfonyl (—NH—SO$_2$—) group, with the oxy (—O—) and oxycarbonyl (—O—CO—) groups being preferred.

Each of $A_1$, $A_{21}$ and $A_{22}$ at its carbon atom is attached to the adjacent nitrogen atom in the formazan skeleton. The coordination bond to M is formed by the nitrogen atom in the heteroaromatic ring for $A_1$ and $A_{21}$ and by Z for $A_{22}$.

Illustrative examples of $A_1$, $A_{21}$ and $A_{22}$ are shown below. Note that A-1, A-2, A-4 to A-7 are examples of $A_1$, A-3 is an example of $A_{21}$, and A-8 to A-13 are examples of $A_{22}$. The asterisk (*) represents the position bonded to N in the formazan skeleton and double asterisks (**) represents the position of coordination bond to M.

[15]

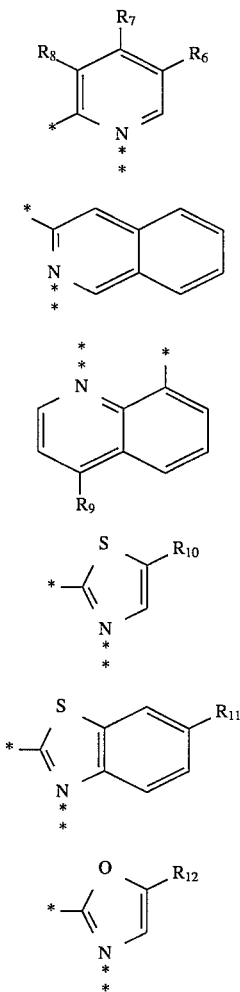

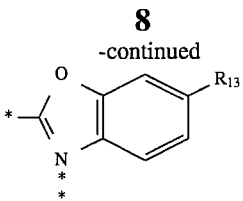

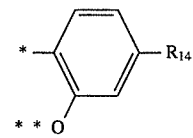

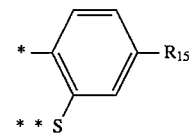

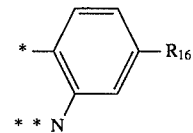

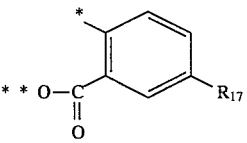

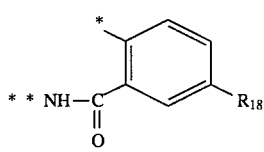

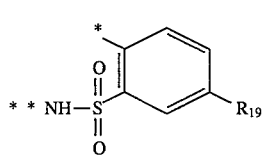

In these examples, $R_6$ to $R_{19}$ are independently a hydrogen atom, halogen atom (e.g., fluorine atom), nitro group, cyano group, or alkyl group preferably having 1 to 6 carbon atoms, more preferably 1 to 4 carbon atoms (e.g., methyl).

Among $A_1$, $A_{21}$ and $A_{22}$, preferred are $A_1$ and $A_{21}$. $A_1$ is especially preferred.

In formulae (I) and (II), Y is an aromatic, alkyl, acyl, alkoxycarbonyl, cyano, nitro, alkoxy or alkylthio group. Examples of the aromatic group include phenyl, naphthyl, anthryl, and 1,3-dioxaindan-5-yl groups, with those groups having 5 to 14 carbon atoms being preferred, especially six-membered rings. The aromatic group may further have a substituent. Exemplary substituents include alkyl groups (e.g., methyl, ethyl, propyl, isopropyl, n-butyl, isobutyl, sec-butyl, and tert-butyl), alkoxy groups (e.g., methoxy, propoxy, isopropoxy, butoxy, isobutoxy, sec -butoxy, tert-butoxy, and 2,3-pentafluoropropoxy), amino groups (e.g., diethylamino and dichlorodiethylamino), halogen atoms (e.g., chlorine and fluorine), aryl groups (e.g., phenyl), aryloxy groups (e.g., phenoxy), alkoxycarbonyl groups (e.g., methoxycarbonyl), acyl groups (e.g., propionyl, butyryl, isobutyryl, valeryl, and isovaleryl), carbamoyl, cyano, and nitro groups. The alkyl groups represented by Y are preferably those having 1 to 18 carbon atoms, especially 2 to 10 carbon atoms, which may be normal or branched. Exemplary are methyl, ethyl, n-propyl, isopropyl, n-butyl, sec-butyl, tert-butyl, n-pentyl, 1-methylbutyl, n-hexyl, n-heptyl, and 1-ethylpentyl groups. Branched alkyl groups having 3 to 8 carbon atoms are preferred. The acyl group represented by Y includes a propionyl group. The alkoxycarbonyl group includes a propoxycarbonyl group. The alkoxy group includes ethoxy and butoxy groups. The alkylthio groups include methylthio and butylthio groups. The alkyl moiety of these alkyl-bearing groups should preferably have 1 to 8 carbon atoms, especially 1 to 6 carbon atoms.

In formulae (I) and (II), $R_1$, $R_2$, $R_3$, $R_4$, and $R_5$ are independently a hydrogen atom, alkyl group (e.g., methyl, 1-methylpropyl and trifluoromethyl), alkoxy group (e.g., ethoxy, butoxy, isobutoxy, sec-butoxy, tert-butoxy, methoxy, octadecyloxy, and hexadecyloxy), nitro group, cyano group, halogen atom (e.g., fluorine and chlorine), aryl group (e.g., phenyl and p-diethylaminophenyl), aryloxy group (e.g., phenoxy), acyl group (e.g., propionyl), alkoxycarbonyl group (e.g., methoxycarbonyl), carbamoyl group, or amino group (e.g., diethylamino). At least one of $R_4$ and $R_5$ is a hydrogen atom. The alkyl group or alkyl moiety should preferably have 1 to 20 carbon atoms, especially 1 to 8 carbon atoms. The aryl group or aryl moiety should preferably have 5 to 10 carbon atoms, with a six-membered ring being especially preferred.

In one preferred embodiment, Y is an aromatic group such as phenyl, a branched alkyl group having 3 to 6 carbon atoms, or an alkoxy or acyl group having a branched alkyl group having 3 to 6 carbon atoms. Also preferably Y is a branched alkyl group having 3 to 8 carbon atoms. Each of $R_1$ to $R_5$ is preferably a branched alkyl group having 3 to 6 carbon atoms, an alkoxy group having a branched alkyl moiety, or an electron attracting group such as nitro and cyano groups. Most preferably $R_2$ is a nitro, cyano or alkoxy group. Where $R_2$ is not a nitro, cyano or alkoxy group, $A_1$, $A_{21}$ or $A_{22}$ has preferably an electron attracting group such as nitro and cyano groups.

In formulae (I) and (II), n representing the number of formazan ligands coordinating to M is equal to 1 or 2. The number of ligands depends on the type of M, that is, n=1 for Ni, Cu, Co, Zn, and Fe, and n=2 for Ni, Co, Pd, Zn, and Fe. Where n=2, the formazan ligands coordinating to M are generally identical, but may be different in some cases. These metal complexes are deemed to assume a structure approximate to a plane tetragonal structure if they are four coordinate and an octahedral structure if they are six coordinate. Then, where n=1, there is formed a structure wherein another ligand coordinates at the remaining coordinate position. What can be the other ligand is a solvent used in the reaction to form the metal complex (e.g., methanol, ethanol, dioxane, pyridine, acetic acid, water, and hydroxide ion), an anion of a metal salt used in introducing a metal (e.g., chloride ion, bromide ion, iodide ion and cyanide ion), or a thiocyanate ion, isothiocyanate ion, ammonia or carbon monoxide to be introduced by ligand exchange reaction after complex formation.

In formulae (I) and (II), X is a counter ion to the formazan metal complex, and k is a number necessary to provide a balance of electric charge. Most formazan metal complex dyes have an electric charge of −2, 0 and 1 valence. In the case of 0 valence, k=0, that is, no counter ion is present. Examples of X include anions such as halide ion, perchlorate ion, tungstate ion, tetrafluoroborate ion, hexafluorophosphate ion, and toluenesulfonate ion, and cations such as ammonium ion, tetraalkylammonium ion, e.g., $(C_4H_9)_4N^+$ and $(C_2H_5)_4N^+$.

The broken lines in formulae (I) and (II) represent coordinate bonds to M.

Among the formazan metal complex dyes of formulae (I) and (II), those dyes of formula (III) are preferred.

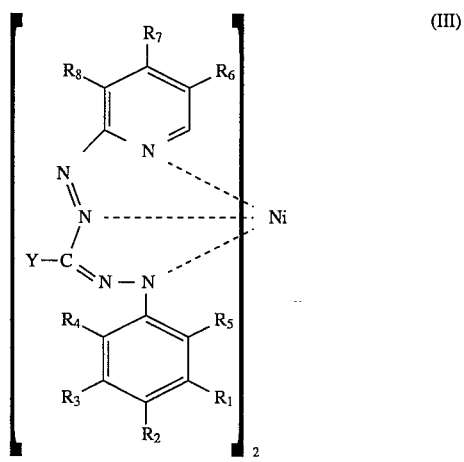

(III)

In formula (III), Y and $R_1$ to $R_5$ are as defined for formulae (I) and (II), with their preferred examples being the same. $R_6$ to $R_8$ are as previously defined in A-1 example of $A_1$, with hydrogen and nitro being preferred.

Illustrative, non-limiting examples of the formazan metal complex dye are given below. These examples are expressed in accordance with formulae (I) and (II) by classifying in terms of $A_1$, $A_{21}$ and $A_{22}$. Where a ligand other than the formazan ligand coordinates, the number of counter ions is shown provided that it is an electrically neutral one. Alkyl and similar groups may be either normal or branched unless otherwise stated.

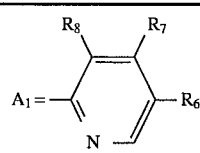

(A-1)

| Compound No. | $R_1$ | $R_2$ | $R_3$ | $R_4$ | $R_5$ | Y | $R_6$ | $R_7$ | $R_8$ | M | n | k | X |
|---|---|---|---|---|---|---|---|---|---|---|---|---|---|
| 1-1 | H | H | H | H | H | -⟨phenyl⟩-C(CH₃)₃ | $NO_2$ | H | H | Ni | 1 | 1 | $ClO_4^-$ |
| 1-2 | H | $CH_3$ | H | $CH_3$ | H | -⟨phenyl⟩-C(CH₃)₃ | $NO_2$ | H | H | Ni | 1 | 1 | $BF_4^-$ |

| No. | | | | | | | | | | | | | |
|---|---|---|---|---|---|---|---|---|---|---|---|---|---|
| 1-3 | H | —CH(CH₃)—C₂H₅ | H | H | H | ⌬—OCH₂CF₂CF₃ | NO₂ | H | H | Ni | 1 | 1 | BF₄⁻ |
| 1-4 | H | C₂H₅O | H | H | H | ⌬—OCH₂CF₂CF₃ | H | H | F | Ni | 1 | 1 | BF₄⁻ |
| 1-5 | H | H | H | H | H | ⌬(methylenedioxy) | NO₂ | H | H | Ni | 1 | 1 | ClO₄⁻ |
| 1-6 | H | NO₂ | H | H | H | ⌬(methylenedioxy) | H | H | H | Ni | 1 | 1 | ClO₄⁻ |
| 1-7 | H | CN | H | H | H | 3,5-(H₃CO)₂-4-CH₃-⌬—OCH₃ | H | CH₃ | H | Ni | 1 | 1 | ClO₄⁻ |
| 1-8 | H | NO₂ | H | H | H | ⌬—N(C₂H₅)₂ | H | H | H | Ni | 1 | 1 | ClO₄⁻ |
| 1-9 | H | NO₂ | H | H | H | —C(CH₃)₃ | H | H | H | Ni | 2 | 0 | — |
| 1-10 | H | NO₂ | H | H | H | —C(=O)—C₂H₅ | H | H | H | Ni | 2 | 0 | — |
| 1-11 | H | NO₂ | H | H | H | —C(=O)—OC₃H₇ | H | H | H | Ni | 2 | 0 | — |
| 1-12 | H | C₄H₉O | H | H | H | CN | H | H | H | Ni | 2 | 0 | — |
| 1-13 | H | C₄H₉O | H | H | H | NO₂ | H | H | H | Ni | 2 | 0 | — |
| 1-14 | H | C₄H₉O | H | H | H | C₂H₅O | H | H | H | Ni | 2 | 0 | — |
| 1-15 | H | C₄H₉O | H | H | H | CH₃S | H | H | H | Ni | 2 | 0 | — |
| 1-16 | H | C₄H₉O | H | H | H | n-C₄H₉ | H | H | H | Ni | 2 | 0 | — |
| 1-17 | H | C₄H₉O | H | H | H | t-C₄H₉ | H | H | H | Ni | 2 | 0 | — |
| 1-18 | H | H | H | H | H | ⌬—C(CH₃)₃ | NO₂ | H | H | Cu | 1 | 1 | ClO₄⁻ |
| 1-19 | H | —CH(CH₃)—C₂H₅ | H | H | H | ⌬—OCH₂CF₂CF₃ | NO₂ | H | H | Cu | 1 | 1 | ClO₄⁻ |
| 1-20 | H | C₂H₅O | H | H | H | ⌬—OCH₂CF₂CF₃ | H | H | F | Cu | 1 | 1 | ClO₄⁻ |

| No. | | | | | | | | | | | | | |
|---|---|---|---|---|---|---|---|---|---|---|---|---|---|
| 1-21 | H | H | H | H | H | 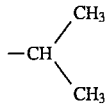 —CH(CH₃)₂ | NO₂ | H | H | Cu | 1 | 1 | BF₄⁻ |
| 1-22 | H | NO₂ | H | H | H | 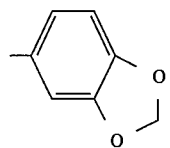 | H | H | H | Cu | 1 | 1 | ClO₄⁻ |
| 1-23 | H | CN | H | H | H | 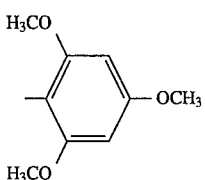 | H | CH₃ | H | Cu | 1 | 1 | ClO₄⁻ |
| 1-24 | H | NO₂ | H | H | H | 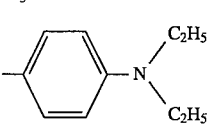 | H | H | H | Cu | 1 | 1 | ClO₄⁻ |
| 1-25 | H | NO₂ | H | H | H | —C(CH₃)₃ | H | H | H | Cu | 1 | 1 | ClO₄⁻ |
| 1-26 | H | NO₂ | H | H | H | —C(O)—C₂H₅ | H | H | H | Cu | 1 | 1 | ClO₄⁻ |
| 1-27 | H | NO₂ | H | H | H | —C(O)—OC₃H₇ | H | H | H | Cu | 1 | 1 | ClO₄⁻ |
| 1-28 | H | C₄H₉O | H | H | H | CN | H | H | H | Ni | 2 | 0 | — |
| 1-29 | H | C₄H₉O | H | H | H | NO₂ | H | H | H | Ni | 2 | 0 | — |
| 1-30 | H | C₄H₉O | H | H | H | C₂H₅O | H | H | H | Ni | 2 | 0 | — |
| 1-31 | H | C₄H₉O | H | H | H | n-C₄H₉ | H | H | H | Cu | 1 | 1 | BF₄⁻ |
| 1-32 | H | C₄H₉O | H | H | H | t-C₄H₉ | H | H | H | Cu | 1 | 1 | BF₄⁻ |
| 1-33 | H | Cl | H | Cl | H | 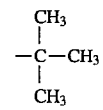 —C(CH₃)₃ | NO₂ | H | H | Co | 2 | 0 | — |
| 1-34 | H | C₂H₅O | H | H | H | 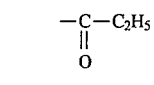 —OCH₂CF₂CF₃ | H | H | H | Co | 2 | 0 | — |
| 1-35 | H | NO₂ | H | H | H | 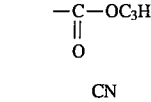 | H | H | H | Co | 2 | 0 | — |
| 1-36 | H | Cl | H | Cl | H | 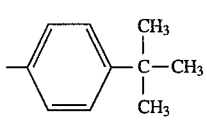 —C(CH₃)₃ | NO₂ | H | H | Pd | 2 | 0 | — |
| 1-37 | H | C₂H₅O | H | H | H | 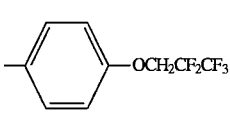 —OCH₂CF₂CF₃ | H | H | H | Pd | 2 | 0 | — |

-continued
| No. | | | | | | | | | | | | |
|---|---|---|---|---|---|---|---|---|---|---|---|---|
| 1-38 | H | NO$_2$ | H | H | H | 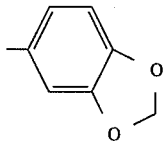 | H | H | H | Pd | 2 | 0 | — |
| 1-39 | H | C$_2$H$_5$O | H | H | H | 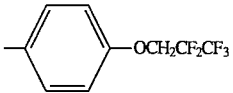 | H | H | H | Zn | 2 | 0 | — |
| 1-40 | H | NO$_2$ | H | H | H | 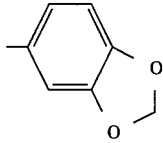 | H | H | H | Zn | 2 | 0 | — |
| 1-41 | H | C$_2$H$_5$O | H | H | H | 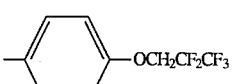 | H | H | H | Fe | 2 | 0 | — |
| 1-42 | H | NO$_2$ | H | H | H | 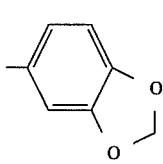 | H | H | H | Fe | 2 | 0 | — |
| 1-43 | H | H | H | H | H | 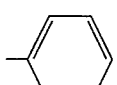 | H | H | H | Ni | 2 | 0 | — |
| 1-44 | H | H | H | H | H | 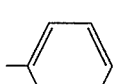 | NO$_2$ | H | H | Ni | 2 | 0 | — |
| 1-45 | H | H | H | H | H | 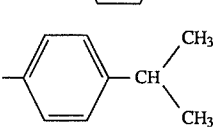 | NO$_2$ | H | H | Ni | 2 | 0 | — |
| 1-46 | H | H | H | H | H | 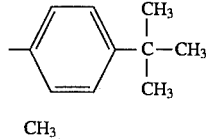 | NO$_2$ | H | H | Ni | 2 | 0 | — |
| 1-47 | H | H | H | H | H | 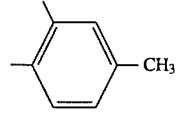 | H | H | H | Ni | 2 | 0 | — |
| 1-48 | H | H | H | H | H | 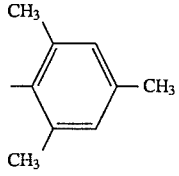 | NO$_2$ | H | H | Ni | 2 | 0 | — |
| 1-49 | H | H | H | H | H | 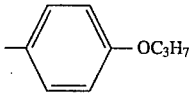 | H | H | H | Ni | 2 | 0 | — |
| 1-50 | H | H | H | H | H | 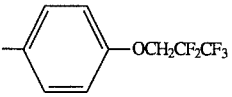 | NO$_2$ | H | H | Ni | 2 | 0 | — |

-continued
| | | | | | | | | | | | | | |
|---|---|---|---|---|---|---|---|---|---|---|---|---|---|
| 1-51 | H | H | H | H | H |  | H | NO$_2$ | H | Ni | 2 | 0 | — |
| 1-52 | H | H | H | H | H | 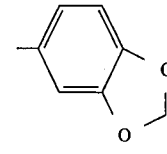 | H | H | H | Ni | 2 | 0 | — |
| 1-53 | H | H | H | H | H | 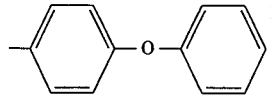 | H | NO$_2$ | H | Ni | 2 | 0 | — |
| 1-54 | H | H | H | H | H | 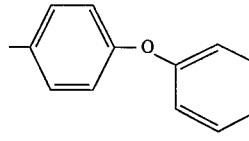 | NO$_2$ | H | H | Ni | 2 | 0 | — |
| 1-55 | H | H | H | H | H | 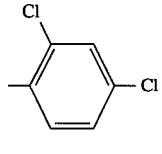 | NO$_2$ | H | H | Ni | 2 | 0 | — |
| 1-56 | H | H | H | H | H | 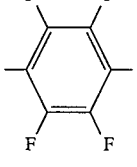 | H | NO$_2$ | H | Ni | 2 | 0 | — |
| 1-57 | H | H | H | H | H | 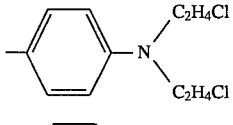 | H | H | H | Ni | 2 | 0 | — |
| 1-58 | H | H | H | H | H | 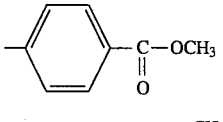 | NO$_2$ | H | H | Ni | 2 | 0 | — |
| 1-59 | H | H | H | H | H | 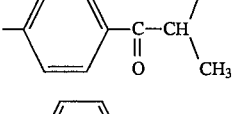 | NO$_2$ | H | H | Ni | 2 | 0 | — |
| 1-60 | H | H | H | H | H | 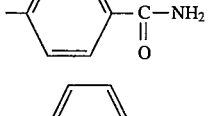 | CN | H | H | Ni | 2 | 0 | — |
| 1-61 | H | H | H | H | H | 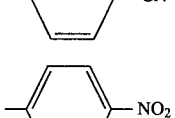 | CN | H | H | Ni | 2 | 0 | — |
| 1-62 | H | H | H | H | H | 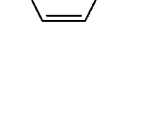 | NO$_2$ | H | H | Ni | 2 | 0 | — |

-continued
| No. | | | | | | | | | | | | |
|---|---|---|---|---|---|---|---|---|---|---|---|---|
| 1-63 | H | H | H | H | H | 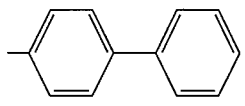 | CN | H | H | Ni | 2 | 0 | — |
| 1-64 | H | —CH(CH₃)—C₂H₅ | H | H | H | 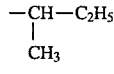 | NO₂ | H | H | Ni | 2 | 0 | — |
| 1-65 | H | CH₃ | H | CH₃ | H | 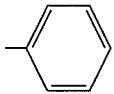 | H | NO₂ | H | Ni | 2 | 0 | — |
| 1-66 | CF₃ | H | H | H | H | 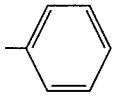 | NO₂ | H | H | Ni | 2 | 0 | — |
| 1-67 | H | CH₃O | H | H | H | 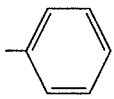 | H | H | H | Ni | 2 | 0 | — |
| 1-68 | CH₃O | CH₃O | H | H | H | 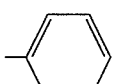 | H | H | H | Ni | 2 | 0 | — |
| 1-69 | H | C₁₈H₃₇O | H | H | H | 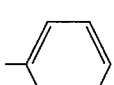 | NO₂ | H | H | Ni | 2 | 0 | — |
| 1-70 | H | —O—C₆H₅ | H | H | H | 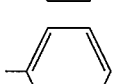 | H | H | H | Ni | 2 | 0 | — |
| 1-71 | H | F | H | F | H | 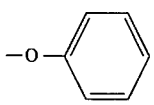 | CN | H | H | Ni | 2 | 0 | — |
| 1-72 | Cl | Cl | H | H | H | 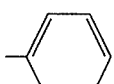 | H | NO₂ | H | Ni | 2 | 0 | — |
| 1-73 | H | —C₆H₄—N(C₂H₅)₂ | H | H | H | 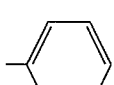 | H | H | H | Ni | 2 | 0 | — |
| 1-74 | H | —C(O)—C₂H₅ | H | H | H | 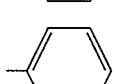 | NO₂ | H | H | Ni | 2 | 0 | — |
| 1-75 | —C(O)—OCH₃ | H | H | H | H | 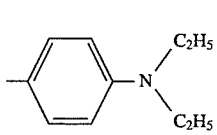 | NO₂ | H | H | Ni | 2 | 0 | — |
| 1-76 | H | —C(O)—NH₂ | H | H | H | 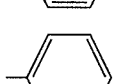 | NO₂ | H | H | Ni | 2 | 0 | — |
| 1-77 | H | CN | H | H | H |  | H | H | H | Ni | 2 | 0 | — |

-continued
| | | | | | | | | | | | | |
|---|---|---|---|---|---|---|---|---|---|---|---|---|
| 1-78 | H |  | H | H | H | 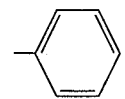 | NO$_2$ | H | H | Ni | 2 | 0 | — |
| 1-79 | H | —CH—C$_2$H$_5$<br>    CH$_3$ | H | H | H | 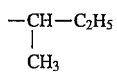 | NO$_2$ | H | H | Ni | 2 | 0 | — |
| 1-80 | CF$_3$ | H | H | H | H | —C—C$_2$H$_5$<br>  ‖<br>  O | NO$_2$ | H | H | Ni | 2 | 0 | — |
| 1-81 | H | CH$_3$O | H | H | H | 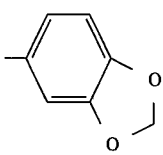 | NO$_2$ | H | H | Ni | 2 | 0 | — |
| 1-82 | H | C$_{18}$H$_{37}$O | H | H | H | 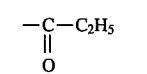 | NO$_2$ | H | H | Ni | 2 | 0 | — |
| 1-83 | H | C$_4$H$_9$O | H | H | H | 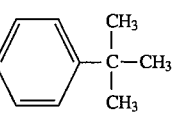 | H | H | H | Ni | 2 | 0 | — |
| 1-84 | H | C$_{16}$H$_{33}$O | H | H | H | 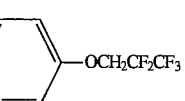 | NO$_2$ | H | H | Ni | 2 | 0 | — |
| 1-85 | H | N(C$_2$H$_5$)$_2$ | H | H | H | 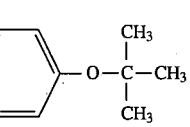 | NO$_2$ | H | H | Ni | 2 | 0 | — |
| 1-86 | H | CN | H | H | H | 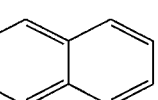 | H | H | H | Ni | 2 | 0 | — |
| 1-87 | H | NO$_2$ | H | H | H | 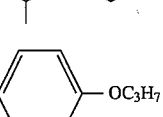 | H | H | H | Ni | 2 | 0 | — |
| 1-88 | H | NO$_2$ | H | H | H |  | H | H | H | Ni | 2 | 0 | — |
| 1-89 | H | NO$_2$ | H | H | H | 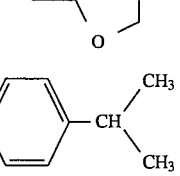 | H | H | H | Ni | 2 | 0 | — |
| 1-90 | H | NO$_2$ | H | H | H | 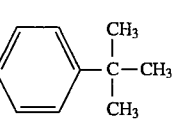 | H | H | H | Ni | 2 | 0 | — |

-continued

| | | | | | | | | | | | |
|---|---|---|---|---|---|---|---|---|---|---|---|
| 1-91 | H | H | NO$_2$ | H | H | 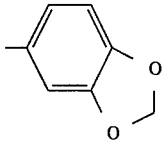 | H | H | H | Ni | 2 | 0 | — |
| 1-92 | H | NO$_2$ | | H | H | 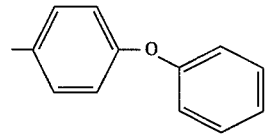 | H | H | H | Ni | 2 | 0 | — |
| 1-93 | H | NO$_2$ | | H | H | $-\underset{\underset{O}{\|\|}}{C}-C_2H_5$ | H | H | H | Ni | 2 | 0 | — |
| 1-94 | H | NO$_2$ | | H | H | $-\underset{\underset{O}{\|\|}}{C}-OC_3H_7$ | H | H | H | Ni | 2 | 0 | — |
| 1-95 | H | $-\underset{\underset{CH_3}{\|}}{CH}-C_2H_5$ | H | H | H | NO$_2$ | NO$_2$ | H | H | Ni | 2 | 0 | — |
| 1-96 | H | $-\underset{\underset{CH_3}{\|}}{CH}-C_2H_5$ | H | H | H | CN | NO$_2$ | H | H | Ni | 2 | 0 | — |
| 1-97 | H | $\underset{H_5C_2}{\overset{H_5C_2}{\diagdown}}N-$ | H | H | H | C$_4$H$_9$O | H | H | H | Ni | 2 | 0 | — |
| 1-98 | H | $-\underset{\underset{CH_3}{\|}}{CH}-C_2H_5$ | H | H | H | C$_4$H$_9$S | NO$_2$ | H | H | Ni | 2 | 0 | — |
| 1-99 | H | $-\underset{\underset{CH_3}{\|}}{CH}-C_2H_5$ | H | H | H | C$_4$H$_9$ | NO$_2$ | H | H | Ni | 2 | 0 | — |
| 1-100 | H | H | H | H | H | CH$_3$ | NO$_2$ | H | H | Ni | 2 | 0 | — |
| 1-101 | H | H | H | H | H | C$_2$H$_5$ | NO$_2$ | H | H | Ni | 2 | 0 | — |
| 1-102 | H | H | H | H | H | n-C$_3$H$_7$ | NO$_2$ | H | H | Ni | 2 | 0 | — |
| 1-103 | H | H | H | H | H | $-CH\underset{\diagdown CH_3}{\diagup CH_3}$ | NO$_2$ | H | H | Ni | 2 | 0 | — |
| 1-104 | H | H | H | H | H | n-C$_4$H$_9$ | NO$_2$ | H | H | Ni | 2 | 0 | — |
| 1-105 | H | H | H | H | H | t-C$_4$H$_9$ | NO$_2$ | H | H | Ni | 2 | 0 | — |
| 1-106 | H | H | H | H | H | $-\underset{\underset{-CH-C_2H_5}{\|}}{CH_3}$ | NO$_2$ | H | H | Ni | 2 | 0 | — |
| 1-107 | H | H | H | H | H | $-\underset{\underset{-CH-C_3H_7}{\|}}{CH_3}$ | NO$_2$ | H | H | Ni | 2 | 0 | — |
| 1-108 | H | H | H | H | H | n-C$_6$H$_{13}$ | NO$_2$ | H | H | Ni | 2 | 0 | — |
| 1-109 | H | H | H | H | H | $-\underset{\underset{-CH-C_4H_9}{\|}}{C_2H_5}$ | NO$_2$ | H | H | Ni | 2 | 0 | — |

-continued
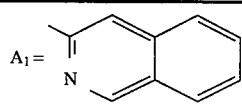
(A-2)
| Compound No. | $R_1$ | $R_2$ | $R_3$ | $R_4$ | $R_5$ | Y | M | n | k | X |
|---|---|---|---|---|---|---|---|---|---|---|
| 2-1 | H | $NO_2$ | H | H | H | -C₆H₄-C(CH₃)₃ | Ni | 2 | 0 | — |
| 2-2 | H | $C_2H_5O$ | H | H | H | -C₆H₃(OC₂H₅)-O- | Ni | 2 | 0 | — |
| 2-3 | H | $C_2H_5O$ | H | H | H | -C₆H₃(OC₂H₅)-O- | Zn | 2 | 0 | — |
| 2-4 | H | $NO_2$ | H | H | H | -C₆H₄-C(CH₃)₃ | Cu | 1 | 0 | — |
| 2-5 | H | $NO_2$ | H | H | H | -C₆H₄-C(CH₃)₃ | Co | 1 | 0 | — |
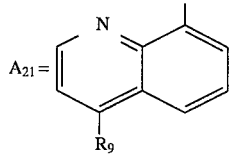
(A-3)
| Compound No. | $R_1$ | $R_2$ | $R_3$ | $R_4$ | $R_5$ | Y | $R_9$ | M | n | k | X |
|---|---|---|---|---|---|---|---|---|---|---|---|
| 3-1 | H | $NO_2$ | H | H | H | -C₆H₄-C(CH₃)₃ | H | Ni | 2 | 0 | — |
| 3-2 | H | $CH_3$ | H | H | H | -C₆H₄-C(CH₃)₃ | $NO_2$ | Ni | 2 | 0 | — |
| 3-3 | H | $C_2H_5O$ | H | H | H | -C₆H₄-OCH₂CF₂CF₃ | $NO_2$ | Ni | 2 | 0 | — |
| 3-4 | H | $NO_2$ | H | H | H | -C₆H₄-C(CH₃)₃ | H | Cu | 1 | 1 | $BF_4^-$ |
| 3-5 | H | $C_2H_5O$ | H | H | H | -C₆H₄-OCH₂CF₂CF₃ | $NO_2$ | Co | 2 | 0 | — |

-continued
$$A_1 = \underset{N}{\overset{S}{\diagdown}} \overset{R_{10}}{\diagup}$$ (A-4)
| Compound No. | $R_1$ | $R_2$ | $R_3$ | $R_4$ | $R_5$ | Y | $R_{10}$ | M | n | k | X |
|---|---|---|---|---|---|---|---|---|---|---|---|
| 4-1 | H | H | H | H | H | 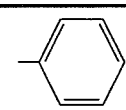 | H | Ni | 2 | 0 | — |
| 4-2 | H | H | H | H | H | 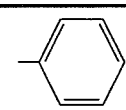 | $NO_2$ | Ni | 2 | 0 | — |
| 4-3 | H | $CH_3O$ | H | H | H | 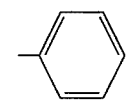 | H | Ni | 2 | 0 | — |
| 4-4 | H | $CH_3O$ | H | H | H | 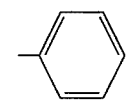 | H | Ni | 1 | 1 | $BF_4^-$ |
| 4-5 | H | $CH_3O$ | H | H | H | 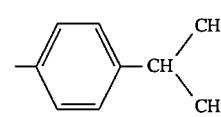 | $NO_2$ | Ni | 2 | 0 | — |
| 4-6 | H | H | H | H | H | 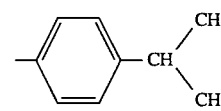 | $NO_2$ | Ni | 2 | 0 | — |
| 4-7 | H | H | H | H | H | 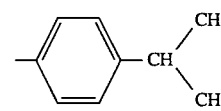 | $NO_2$ | Ni | 1 | 1 | $ClO_4^-$ |
| 4-8 | H | H | H | H | H | 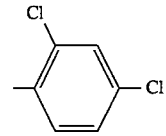 | $NO_2$ | Ni | 2 | 0 | — |
| 4-9 | H | $NO_2$ | H | H | H | 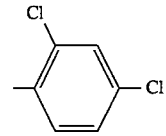 | H | Ni | 2 | 0 | — |
| 4-10 | H | CN | H | H | H | 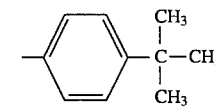 | H | Ni | 2 | 0 | — |
| 4-11 | H | $NO_2$ | H | H | H | 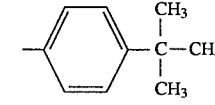 | H | Ni | 2 | 0 | — |

-continued
| | | | | | | | | | | | |
|---|---|---|---|---|---|---|---|---|---|---|---|
| 4-12 | H | CH$_3$O | H | H | H | 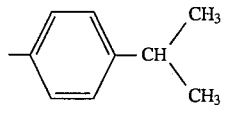 | H | Zn | 2 | 0 | — |
| 4-13 | H | CH$_3$O | H | H | H | 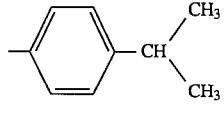 | H | Zn | 1 | 1 | BF$_4^-$ |
| 4-14 | H | CH$_3$O | H | H | H | 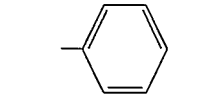 | NO$_2$ | Zn | 2 | 0 | — |
| 4-15 | H | H | H | H | H | 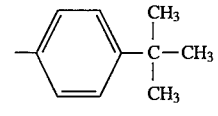 | NO$_2$ | Zn | 2 | 0 | — |
| 4-16 | H | H | H | H | H | 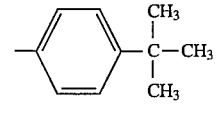 | NO$_2$ | Zn | 1 | 1 | ClO$_4^-$ |
| 4-17 | H | H | H | H | H | 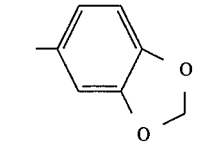 | NO$_2$ | Zn | 2 | 0 | — |
| 4-18 | H | NO$_2$ | H | H | H | 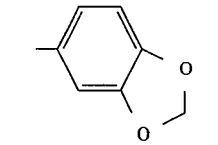 | H | Zn | 2 | 0 | — |
| 4-19 | H | CN | H | H | H | 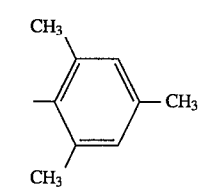 | H | Zn | 2 | 0 | — |
| 4-20 | H | NO$_2$ | H | H | H | 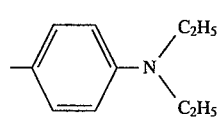 | H | Zn | 2 | 0 | — |
| 4-21 | H | NO$_2$ | H | H | H | 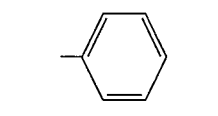 | H | Cu | 1 | 1 | ClO$_4^-$ |
| 4-22 | H | CH$_3$O | H | H | H | 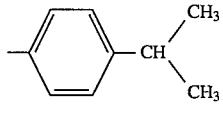 | H | Cu | 1 | 1 | BF$_4^-$ |
| 4-23 | H | H | H | H | H | 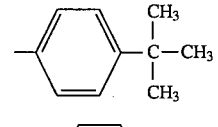 | NO$_2$ | Cu | 1 | 1 | BF$_4^-$ |
| 4-24 | H | H | H | H | H | 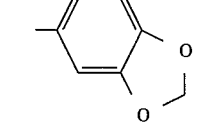 | NO$_2$ | Cu | 1 | 1 | BF$_4^-$ |

-continued

| Compound No. | $R_1$ | $R_2$ | $R_3$ | $R_4$ | $R_5$ | Y | $R_{11}$ | M | n | k | X |
|---|---|---|---|---|---|---|---|---|---|---|---|
| 4-25 | H | $NO_2$ | H | H | H | phenyl | H | Co | 2 | 0 | — |
| 4-26 | H | $CH_3O$ | H | H | H | 4-isopropylphenyl | H | Co | 2 | 0 | — |
| 4-27 | H | H | H | H | H | 4-tert-butylphenyl | $NO_2$ | Co | 2 | 0 | — |
| 4-28 | H | H | H | H | H | 3,4-(methylenedioxy ethyl)phenyl | $NO_2$ | Co | 2 | 0 | — |

(A-5)

$$A_1 = \underset{N}{\overset{S}{\bigvee}} \!\!\!-\!\!\! \bigcirc \!\!\!-\!\! R_{11}$$

| Compound No. | $R_1$ | $R_2$ | $R_3$ | $R_4$ | $R_5$ | Y | $R_{11}$ | M | n | k | X |
|---|---|---|---|---|---|---|---|---|---|---|---|
| 5-1 | H | $NO_2$ | H | H | H | 4-isopropylphenyl | H | Ni | 2 | 0 | — |
| 5-2 | H | $NO_2$ | H | H | H | 4-isopropylphenyl | H | Ni | 1 | 1 | $BF_4^-$ |
| 5-3 | H | H | H | H | H | 4-tert-butylphenyl | $NO_2$ | Ni | 2 | 0 | — |
| 5-4 | H | H | H | H | H | 4-tert-butylphenyl | $NO_2$ | Ni | 1 | 1 | $ClO_4^-$ |
| 5-5 | H | H | H | H | H | 3,4-(methylenedioxy ethyl)phenyl | $NO_2$ | Ni | 2 | 0 | — |
| 5-6 | H | $NO_2$ | H | H | H | 3,4-(methylenedioxy ethyl)phenyl | H | Ni | 2 | 0 | — |
| 5-7 | H | $NO_2$ | H | H | H | 4-(N,N-diethylamino)phenyl | H | Ni | 2 | 0 | — |

-continued

| No. | | | | | | Ar | | M | n | m | X |
|---|---|---|---|---|---|---|---|---|---|---|---|
| 5-8 | H | CH₃O | H | H | H | 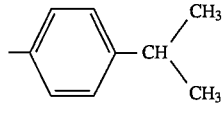 4-CH(CH₃)₂-C₆H₄ | H | Zn | 2 | 0 | — |
| 5-9 | H | CH₃O | H | H | H | 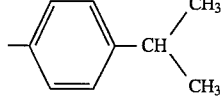 4-CH(CH₃)₂-C₆H₄ | H | Zn | 1 | 1 | BF₄⁻ |
| 5-10 | H | H | H | H | H | 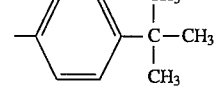 4-C(CH₃)₃-C₆H₄ | NO₂ | Zn | 2 | 0 | — |
| 5-11 | H | H | H | H | H | 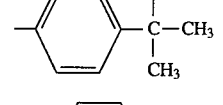 4-C(CH₃)₃-C₆H₄ | NO₂ | Zn | 1 | 1 | ClO₄⁻ |
| 5-12 | H | H | H | H | H | 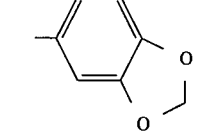 3,4-methylenedioxyphenyl | NO₂ | Zn | 2 | 0 | — |
| 5-13 | H | NO₂ | H | H | H | 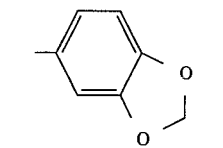 3,4-methylenedioxyphenyl | H | Zn | 2 | 0 | — |
| 5-14 | H | CN | H | H | H | 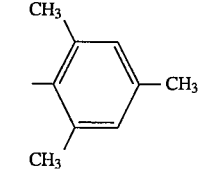 2,4,5-trimethylphenyl | H | Zn | 2 | 0 | — |
| 5-15 | H | NO₂ | H | H | H | 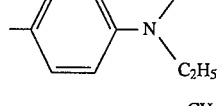 4-N(C₂H₅)₂-C₆H₄ | H | Zn | 2 | 0 | — |
| 5-16 | H | CH₃O | H | H | H | 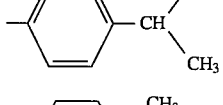 4-CH(CH₃)₂-C₆H₄ | H | Cu | 1 | 1 | BF₄⁻ |
| 5-17 | H | H | H | H | H | 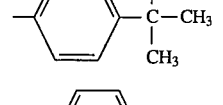 4-C(CH₃)₃-C₆H₄ | NO₂ | Cu | 1 | 1 | BF₄⁻ |
| 5-18 | H | H | H | H | H | 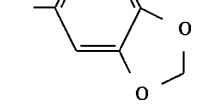 3,4-methylenedioxyphenyl | NO₂ | Cu | 1 | 1 | BF₄⁻ |
| 5-19 | H | CH₃O | H | H | H | 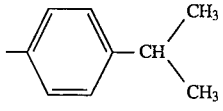 4-CH(CH₃)₂-C₆H₄ | H | Co | 2 | 0 | — |

-continued

| | | | | | | Y | | | | | |
|---|---|---|---|---|---|---|---|---|---|---|---|
| 5-20 | H | H | H | H | H | 4-(C(CH₃)₃)-phenyl | NO₂ | Co | 2 | 0 | — |
| 5-21 | H | H | H | H | H | 3,4-(OCH₂CH₂O)-phenyl (ethylenedioxy) | NO₂ | Co | 2 | 0 | — |

$$A_1 = \overset{O}{\underset{N}{\diagdown}}\!\!\!\diagup\!\!\!\overset{R_{12}}{\diagdown} \quad (A\text{-}6)$$

| Compound No. | $R_1$ | $R_2$ | $R_3$ | $R_4$ | $R_5$ | Y | $R_{12}$ | M | n | k | X |
|---|---|---|---|---|---|---|---|---|---|---|---|
| 6-1 | H | CH₃O | H | H | H | 4-(CH(CH₃)₂)-phenyl | H | Ni | 2 | 0 | — |
| 6-2 | H | CH₃O | H | H | H | 4-(CH(CH₃)₂)-phenyl | H | Ni | 1 | 1 | BF₄⁻ |
| 6-3 | H | H | H | H | H | 4-(C(CH₃)₃)-phenyl | NO₂ | Ni | 2 | 0 | — |
| 6-4 | H | H | H | H | H | 3,4-(OCH₂CH₂O)-phenyl | NO₂ | Ni | 2 | 0 | — |
| 6-5 | H | NO₂ | H | H | H | 3,4-(OCH₂CH₂O)-phenyl | H | Ni | 2 | 0 | — |
| 6-6 | H | CN | H | H | H | 2,4,6-trimethylphenyl | H | Ni | 2 | 0 | — |
| 6-7 | H | NO₂ | H | H | H | 4-(N(C₂H₅)₂)-phenyl | H | Ni | 2 | 0 | — |
| 6-8 | N | CH₃O | H | H | H | 4-(CH(CH₃)₂)-phenyl | H | Zn | 2 | 0 | — |
| 6-9 | H | CH₃O | H | H | H | 4-(CH(CH₃)₂)-phenyl | H | Zn | 1 | 1 | BF₄⁻ |

-continued

| | | | | | | Ar | | | | | |
|---|---|---|---|---|---|---|---|---|---|---|---|
| 6-10 | H | CH₃O | H | H | H | (phenyl) | NO₂ | Zn | 2 | 0 | — |
| 6-11 | H | H | H | H | H | 4-(C(CH₃)₂CH₃)-phenyl | NO₂ | Zn | 2 | 0 | — |
| 6-12 | H | H | H | H | H | 4-(C(CH₃)₂CH₃)-phenyl | NO₂ | Zn | 1 | 1 | ClO₄⁻ |
| 6-13 | H | H | H | H | H | 3,4-methylenedioxyphenyl | NO₂ | Zn | 2 | 0 | — |
| 6-14 | H | CN | H | H | H | 2,4,6-trimethylphenyl | H | Zn | 2 | 0 | — |
| 6-15 | H | NO₂ | H | H | H | 4-(N(C₂H₅)₂)-phenyl | H | Zn | 2 | 0 | — |
| 6-16 | H | CH₃O | H | H | H | 4-(CH(CH₃)₂)-phenyl | H | Cu | 1 | 1 | ClO₄⁻ |
| 6-17 | H | NO₂ | H | H | H | 4-(C(CH₃)₂CH₃)-phenyl | H | Cu | 1 | 1 | BF₄⁻ |
| 6-18 | H | H | H | H | H | 3,4-methylenedioxyphenyl | NO₂ | Cu | 1 | 1 | BF₄⁻ |
| 6-19 | H | NO₂ | H | H | H | phenyl | H | Co | 2 | 0 | — |
| 6-20 | H | CH₃O | H | H | H | 4-(CH(CH₃)₂)-phenyl | H | Co | 2 | 0 | — |
| 6-21 | H | H | H | H | H | 4-(C(CH₃)₂CH₃)-phenyl | NO₂ | Co | 2 | 0 | — |

-continued
| | | | | | | Y | | M | n | k | X |
|---|---|---|---|---|---|---|---|---|---|---|---|
| 6-22 | H | H | H | H | H | 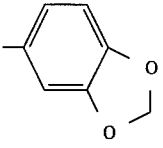 | NO₂ | Co | 2 | 0 | — |
$$A_1 = \text{(A-7)}$$
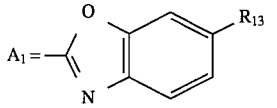
| Compound No. | R₁ | R₂ | R₃ | R₄ | R₅ | Y | R₁₃ | M | n | k | X |
|---|---|---|---|---|---|---|---|---|---|---|---|
| 7-1 | H | CH₃O | H | H | H | 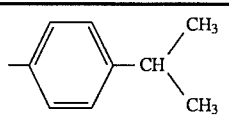 | H | Ni | 2 | 0 | — |
| 7-2 | H | H | H | H | H | 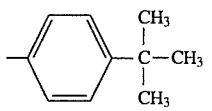 | NO₂ | Ni | 2 | 0 | — |
| 7-3 | H | H | H | H | H | 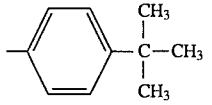 | NO₂ | Ni | 1 | 1 | ClO₄⁻ |
| 7-4 | H | H | H | H | H | 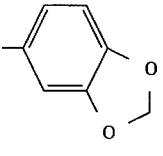 | NO₂ | Ni | 2 | 0 | — |
| 7-5 | H | NO₂ | H | H | H | 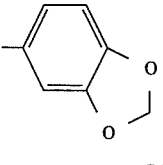 | H | Ni | 2 | 0 | — |
| 7-6 | H | NO₂ | H | H | H | 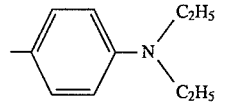 | H | Ni | 2 | 0 | — |
| 7-7 | H | H | H | H | H | 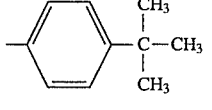 | NO₂ | Zn | 2 | 0 | — |
| 7-8 | H | NO₂ | H | H | H | 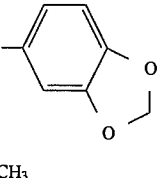 | H | Zn | 2 | 0 | — |
| 7-9 | H | CN | H | H | H | 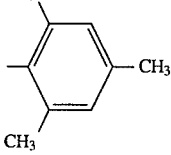 | H | Zn | 2 | 0 | — |
| 7-10 | H | CH₃O | H | H | H | 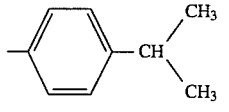 | H | Cu | 1 | 1 | BF₄⁻ |

-continued
| 7-11 | H | H | H | H | H | 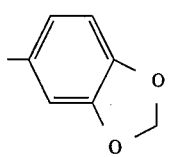 | NO$_2$ | Cu | 1 | 1 | BF$_4^-$ |
$$A_{22} = \text{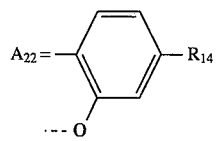} \quad (A\text{-}8)$$
| Compound No. | R$_1$ | R$_2$ | R$_3$ | R$_4$ | R$_5$ | Y | R$_{14}$ | M | n | k | X |
|---|---|---|---|---|---|---|---|---|---|---|---|
| 8-1 | H | NO$_2$ | H | H | H | $_3$) | H | Ni | 2 | 2 | (C$_4$H$_9$)$_4$N$^+$ |
| 8-2 | H | NO$_2$ | H | H | H | $_3$) | H | Ni | 1 | 0 | — |
| 8-3 | H | —CH(CH$_3$)—C$_2$H$_5$ | H | H | H | | NO$_2$ | Ni | 1 | 0 | — |
| 8-4 | H | NO$_2$ | H | H | H | $_3$) | H | Cu | 1 | 0 | — |
| 8-5 | H | —CH(CH$_3$)—C$_2$H$_5$ | H | H | H | | NO$_2$ | Cu | 1 | 0 | — |
| 8-6 | H | NO$_2$ | H | H | H | $_2$) | H | Co | 2 | 1 | (C$_4$H$_9$)$_4$N$^+$ |
| 8-7 | H | NO$_2$ | H | H | H | $_2$) | H | Co | 1 | 0 | — |
| 8-8 | H | —CH(CH$_3$)—C$_2$H$_5$ | H | H | H | | NO$_2$ | Fe | 1 | 0 | — |
| 8-9 | H | —CH(CH$_3$)—C$_2$H$_5$ | H | H | H | | NO$_2$ | Pd | 2 | 1 | (C$_4$H$_9$)$_4$N$^+$ |

-continued $$A_{22}= \text{(benzene ring with } R_{15}\text{ and } S\text{---)} \quad \text{(A-9)}$$

| Compound No. | $R_1$ | $R_2$ | $R_3$ | $R_4$ | $R_5$ | Y | $R_{15}$ | M | n | k | X |
|---|---|---|---|---|---|---|---|---|---|---|---|
| 9-1 | H | $NO_2$ | H | H | H | -C6H4-C(CH3)2-CH3 | H | Ni | 2 | 2 | $(C_4H_9)_4N^+$ |
| 9-2 | H | $NO_2$ | H | H | H | -C6H4-C(CH3)2-CH3 | H | Ni | 1 | 0 | — |
| 9-3 | H | -CH(CH3)-C2H5 | H | H | H | methylenedioxyphenyl (-OCH2O-) | $NO_2$ | Ni | 1 | 0 | — |
| 9-4 | H | $NO_2$ | H | H | H | -C6H4-C(CH3)2-CH3 | H | Cu | 1 | 0 | — |
| 9-5 | H | -CH(CH3)-C2H5 | H | H | H | methylenedioxyphenyl | $NO_2$ | Cu | 1 | 0 | — |
| 9-6 | H | $NO_2$ | H | H | H | -C6H4-N(C2H5)2 | H | Co | 2 | 2 | $(C_4H_9)_4N^+$ |
| 9-7 | H | $NO_2$ | H | H | H | -C6H4-N(C2H5)2 | H | Co | 1 | 0 | — |
| 9-8 | H | -CH(CH3)-C2H5 | H | H | H | methylenedioxyphenyl | $NO_2$ | Fe | 1 | 0 | — |
| 9-9 | H | -CH(CH3)-C2H5 | H | H | H | methylenedioxyphenyl | $NO_2$ | Pd | 2 | 2 | $(C_4H_9)_4N^+$ |

-continued

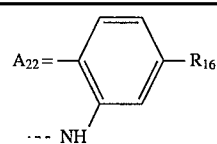
(A-10)

| Compound No. | R₁ | R₂ | R₃ | R₄ | R₅ | Y | R₁₅ | M | n | k | X |
|---|---|---|---|---|---|---|---|---|---|---|---|
| 10-1 | H | NO₂ | H | H | H | —C₆H₄—C(CH₃)₃ | H | Ni | 2 | 2 | (C₄H₉)₄N⁺ |
| 10-2 | H | NO₂ | H | H | H | —C₆H₄—C(CH₃)₃ | H | Ni | 1 | 0 | — |
| 10-3 | H | —CH(CH₃)—C₂H₅ | H | H | H | methylenedioxyphenyl | NO₂ | Ni | 1 | 0 | — |
| 10-4 | H | NO₂ | H | H | H | —C₆H₄—C(CH₃)₃ | H | Cu | 1 | 0 | — |
| 10-5 | H | —CH(CH₃)—C₂H₅ | H | H | H | methylenedioxyphenyl | NO₂ | Cu | 1 | 0 | — |
| 10-6 | H | NO₂ | H | H | H | —C₆H₄—N(C₂H₅)₂ | H | Co | 2 | 2 | (C₄H₉)₄N⁺ |
| 10-7 | H | NO₂ | H | H | H | —C₆H₄—N(C₂H₅)₂ | H | Co | 1 | 0 | — |
| 10-8 | H | —CH(CH₃)—C₂H₅ | H | H | H | methylenedioxyphenyl | NO₂ | Fe | 1 | 0 | — |
| 10-9 | H | —CH(CH₃)—C₂H₅ | H | H | H | methylenedioxyphenyl | NO₂ | Pd | 2 | 2 | (C₄H₉)₄N⁺ |

-continued

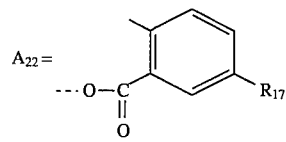
(A-11)

$A_{22} = $ ---O—C(=O)— phenyl with 2-methyl and 5-$R_{17}$

| Compound No. | $R_1$ | $R_2$ | $R_3$ | $R_4$ | $R_5$ | Y | $R_{17}$ | M | n | k | X |
|---|---|---|---|---|---|---|---|---|---|---|---|
| 11-1 | H | $NO_2$ | H | H | H | 3,4-(ethylenedioxy)phenyl | H | Ni | 2 | 2 | $(C_4H_9)_4N^+$ |
| 11-2 | H | $NO_2$ | H | H | H | 3,4-(ethylenedioxy)phenyl | H | Ni | 1 | 0 | — |
| 11-3 | H | $CH_3O$ | H | H | H | 4-(t-butyl)phenyl | $NO_2$ | Ni | 1 | 0 | — |
| 11-4 | H | Cl | H | Cl | H | 3,4-(ethylenedioxy)phenyl | $NO_2$ | Cu | 1 | 0 | — |
| 11-5 | H | $CH_3O$ | H | H | H | 4-(t-butyl)phenyl | H | Cu | 1 | 0 | — |
| 11-6 | H | $NO_2$ | H | H | H | 3,4-(ethylenedioxy)phenyl | H | Co | 2 | 0 | — |
| 11-7 | H | $CH_3O$ | H | H | H | 4-(t-butyl)phenyl | H | Co | 2 | 0 | — |
| 11-8 | H | $NO_2$ | H | H | H | 3,4-(ethylenedioxy)phenyl | H | Pd | 2 | 0 | — |
| 11-9 | H | $CH_3O$ | H | H | H | 4-(t-butyl)phenyl | H | Pd | 2 | 0 | — |

-continued

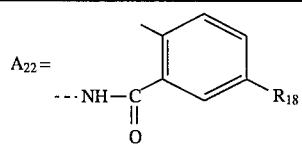
(A-12)

| Compound No. | $R_1$ | $R_2$ | $R_3$ | $R_4$ | $R_5$ | Y | $R_{18}$ | M | n | k | X |
|---|---|---|---|---|---|---|---|---|---|---|---|
| 12-1 | H | $NO_2$ | H | H | H | ![p-tBu-C6H4] | H | Ni | 2 | 2 | $(C_4H_9)_4N^+$ |
| 12-2 | H | $CH_3O$ | H | H | H | ![p-tBu-C6H4] | $NO_2$ | Ni | 1 | 0 | — |
| 12-3 | H | $-\underset{CH_3}{\underset{|}{CH}}-C_2H_5$ | H | H | H | ![p-OCH2CF2CF3-C6H4] | $NO_2$ | Ni | 2 | 0 | — |
| 12-4 | H | $-\underset{CH_3}{\underset{|}{CH}}-C_2H_5$ | H | H | H | ![p-OCH2CF2CF3-C6H4] | $NO_2$ | Cu | 1 | 0 | — |
| 12-5 | H | $CH_3O$ | H | H | H | ![p-tBu-C6H4] | H | Cu | 1 | 0 | — |

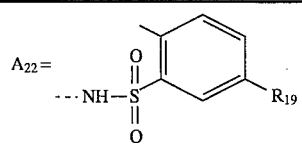
(A-13)

| Compound No. | $R_1$ | $R_2$ | $R_3$ | $R_4$ | $R_5$ | Y | $R_{19}$ | M | n | k | X |
|---|---|---|---|---|---|---|---|---|---|---|---|
| 13-1 | H | $NO_2$ | H | H | H | ![p-tBu-C6H4] | H | Ni | 2 | 2 | $(C_4H_9)_4N^+$ |
| 13-2 | H | $CH_3O$ | H | H | H | ![p-tBu-C6H4] | $NO_2$ | Ni | 1 | 0 | — |
| 13-3 | H | $-\underset{CH_3}{\underset{|}{CH}}-C_2H_5$ | H | H | H | ![p-OCH2CF2CF3-C6H4] | $NO_2$ | Ni | 2 | 0 | — |
| 13-4 | H | $-\underset{CH_3}{\underset{|}{CH}}-C_2H_5$ | H | H | H | ![p-OCH2CF2CF3-C6H4] | $NO_2$ | Cu | 1 | 0 | — |
| 13-5 | H | $CH_3O$ | H | H | H | ![p-tBu-C6H4] | H | Cu | 1 | 0 | — |

These formazan metal complex dyes can be produced by mixing predetermined amounts of a formazan ligand and a metal salt in a non-aqueous solvent such as methanol, dioxane, and acetone or a mixture thereof and agitating the mixture for reaction. The reaction temperature may be room temperature (15° to 30° C.) and the reaction time may be 60 minutes or less. Sometimes, reaction completes immediately after mixing and agitation.

The formazan ligands used herein can be synthesized by known techniques. Reference is made to A. Uchiumi, et al., Anal. Sci., 7, 119 (1991), A. Uchiumi, et al., Anal. Sci., 7, 459 (1991), A. Kawase, Bunseki Kagaku (Analytical Chemistry), Vol. 16, 1364 (1967), and JP-A 144997/1987. The metal salts used herein may be acetates (e.g., nickel acetate and copper acetate anhydride), chlorides (e.g., nickel chloride hexahydrate, cupric chloride dihydrate, cobalt chloride hexahydrate, and ferrous chloride anhydride), and perchlorates (e.g., nickel perchlorate hexahydrate and copper perchlorate hexahydrate).

The thus synthesized formazan metal complex dyes may be identified by elemental analysis, mass analysis, and visible and UV absorption spectroscopy.

The formazan metal complex dyes according to the invention are relatively easy to synthesize and cost effective.

The formazan ligand coordinates at three points (tridentate) to provide relatively great steric hindrance, contributing to solubility. For example, the formazan metal complex dyes have a solubility of about 2 to 12% by weight in dichloroethane at 25° C.

When it is desired to form a dye film for use as a recording layer of an optical recording medium, the increased solubility ensures that the dye is dissolved in a solvent which does not attack a substrate material such as polycarbonate resin. A dye coating can be formed simply by spin coating. It is thus possible to form a recording layer of sufficient thickness by coating.

Since the formazan metal complex dyes are susceptible to thermal decomposition, they are useful light-absorbing dyes in the recording layer of optical recording media designed to cooperate with a laser.

The formazan metal complex dyes according to the invention have absorption maximum ($\lambda$max) at 550 to 700 nm, exhibiting relatively broad absorption. They experience a minimal change of their properties in response to variations and drifts of the oscillation wavelength of a semiconductor laser. A wide margin is available for manufacture. They have a greater coefficient of light absorption so that their thin film has a high refractive index. This is favorable from the recording principle of optical discs. Since they offer relatively high reflectance over a wide wavelength range, adaptation to lasers of different wavelengths is possible. Therefore, the dyes are applicable to not only the write-once compact discs assigned to 780 nm, but also various semiconductor lasers of 450 to 700 nm wavelength and optical discs of the next generation corresponding to such shorter wavelength lasers.

The formazan metal complex dyes according to the invention are used in the recording layer of optical recording media as a light-absorbing dye. These dyes may be used alone or in admixture of two or more or in combination with another type of dye such as cyanine, azo and phthalocyanine dyes.

In the practice of the invention, a recording layer of an optical recording medium is preferably formed using a dye-containing coating solution. Spin coating is preferred. That is, the coating solution is spread and coated onto a rotating substrate. The coating solvent may be selected from alcohols (e.g., ketoalcohols and monoalkyl ethers of ethylene glycol or cellosolves), ketones, esters, ethers, aliphatic hydrocarbons, aromatics, and halogenated alkyls. In particular, those dyes of formulae (I) and (II), especially (III) wherein Y is an alkyl group having 4 to 18 carbon atoms, especially a branched alkyl group having 6 to 12 carbon atoms have a solubility of about 0.2 to 10% by weight in aliphatic hydrocarbon solvents. Then aliphatic hydrocarbon solvents having a high evaporation rate and amenable to mass production are advantageously used as the coating solvent.

Preferred among the above-mentioned solvents are alcohols, for example, ketoalcohols such as diacetone alcohol, and ethylene glycol monoalkyl ethers (or cellosolves), such as ethylene glycol monomethyl ether (methyl cellosolve), ethylene glycol monoethyl ether (ethyl cellosolve), and 1-methoxy-2-propanol. More preferred are ethylene glycol monoalkyl ethers, typically ethylene glycol monoethyl ether and 1-methoxy-2-propanol. Fluorinated alcohols are also useful, especially 2,2,3,3-tetrafluoropropanol. For the above-mentioned dyes wherein Y is an alkyl group, aliphatic hydrocarbon solvents such as cyclohexane, methylcyclohexane, and ethylcyclohexane are preferred.

The coating solution preferably contains about 1.5 to 15% by weight, more preferably about 1.5 to 10% by weight of the dye. If desired, the coating solution may further contain a binder, dispersant and stabilizer.

After spin coating, the coating film is dried if desired. The dye coating or recording layer thus formed generally has a thickness of about 1,000 to 3,000 Å although the thickness may be determined in accordance with intended reflectance and other parameters.

In addition to the use as light-absorbing dyes in the recording layer of optical recording media, the formazan metal complex dyes according to the invention are also useful as photo-stabilizers. That is, the formazan metal complex dyes are used as photo-stabilizers in the recording layer in combination with other light-absorbing dyes. The light-absorbing dyes which can be used in this embodiment are not critical and include cyanine, phthalocyanine, and azo dyes. The cyanine and phthalocyanine dyes are preferred, with the cyanine dyes being more preferred. Examples of the cyanine dye include trimethine, pentamethine, and heptamethine cyanine dyes while the trimethine and pentamethine cyanine dyes are preferred, with the pentamethine cyanine dyes being most preferred. Also useful are indolenine cyanine dyes wherein the indolenine ring may have an aromatic fused ring such as a benzene ring and the two indolenine rings may have different fused conditions. Preferred are an indolenine ring and an indolenine ring having a benzene ring fused at the 4 and 5-positions or 6 and 7-positions. Preferred phthalocyanine dyes have Si, Al, Cu, Ni, Co, Fe, Pd and VO as the center atom while they may be tetra- to octa-substituted ones. For Si and Al center atoms, it is preferred that a ligand be attached at an axial position. Exemplary ligands are alkoxy, siloxy and phosphate derivative groups. Two ligands are attached at axial position for Si and one ligand is attached for Al. The substituents include phenoxy, phenyl, (o-alkyl)phenyl, and alkoxy groups. Especially preferred are tetra- to octaphenoxy substituted, tetra- to octaphenyl substituted, tetra- to octa(o-alkyl)phenyl substituted and tetra- to octaalkoxy substituted phthalocyanine dyes having the above-mentioned center atoms.

In this embodiment, the recording layer preferably contains the formazan metal complex dye in an amount of about 2 to 98 mol %, more preferably about 5 to 50 mol % based on the light-absorbing dye. For commonly used light-absorbing dyes, about 5 to 20 mol % based on the light-absorbing dye of formazan metal complex dyes are sufficient to provide light resistance. Lesser amounts of the formazan metal complex dye would be ineffective as a photo-stabilizer whereas in excess amounts, the function of the formazan metal complex dye as a photo-stabilizer would be saturated.

In the embodiment where a light-absorbing dye is used in combination with a formazan metal complex dye, the recording layer may be formed using a coating solution containing these compounds in a desired proportion. Typically the coating solution contains about 1.5 to 15% by weight, especially about 1.5 to 10% by weight of the compounds combined. The coating solution may further contain a binder, dispersant or the like if desired and be applied by conventional techniques as mentioned above.

Referring to FIG. 1, an optical recording medium according to one embodiment of the invention is schematically illustrated as comprising a recording layer in the form of a dye film on a substrate. The optical recording disc 1 includes a substrate 2 having front and back surfaces (upper and lower surfaces in the figure) and a groove 23 in the upper surface. The optical recording disc 1 is shown in FIG. 1 as comprising an dye base recording layer 3 on the front surface of the grooved substrate 2, a reflective layer 4 disposed on the surface of the recording layer 3, and a protective layer 5 disposed on the surface of the reflective layer 4. Recording and reading light is directed to the recording layer 3 within the groove 23 from the back surface side of the substrate 2. Since the reflective layer is in close contact with the recording layer, this optical recording disc 1 is a close contact type optical recording disc capable of reading in accordance with the CD standard.

The substrate 2 is often of conventional disc shape and has commonly used dimensions, for example, a thickness of about 1.2 mm and a diameter of about 64 to 200 mm. The substrate 2 is made of a resin or glass which is substantially transparent to recording and reading light, typically a semiconductor laser beam having a wavelength of 600 to 900 nm, especially 770 to 900 nm, typically 780 nm. The substrate material preferably has a transmittance of at least 88% so that recording and reading operation can be made through the substrate 2, that is, from the back surface of the substrate 2 remote from the recording layer 3.

On the upper surface of the substrate 2 where the recording layer 3 is formed, the groove 23 is formed in a predetermined pattern for tracking purposes. The remaining surface is designated a land. Differently stated, the adjoining groove turns 23 are separated by a land. The groove 23 is preferably a continuous spiral groove. Preferably the groove 23 has a depth of 0.1 to 0.25 μm, a width of 0.35 to 0.50 μm and a pitch of 1.5 to 1.7 μm. With such dimensions, satisfactory tracking signals are obtained without lowering the reflection level in the groove. It is important to limit the groove width to 0.35 to 0.50 μm because with a groove width of less than 0.35 μm, tracking signals are often of insufficient magnitude so that a slight tracking offset during recording can cause an increased jitter. With a groove width of more than 0.50 μm, read-out signals often have distorted waveforms, resulting in increased crosstalk.

The substrate 2 may be made of any of conventional resins, typically thermoplastic resins such as polycarbonate resin, acrylic resins, amorphous polyolefins, TPX, and polystyrene resins. The substrate can be formed by molding such a resin by well-known techniques such as injection molding. The groove 23 may be formed at the same time as the substrate 2 is molded. Alternatively, a resin layer (not shown) having a predetermined pattern of groove may be formed on the substrate by 2P (photo-polymerization) method or the like. If desired, glass substrates may be used.

The recording layer 3 is formed on the grooved substrate 2 by using a coating solution containing the formazan metal complex dye according to the invention as a light-absorbing dye or a photo-stabilizer and applying it preferably by a spin coating technique. Spin coating may be performed under conventional conditions so as to spread the solution from the inner to the outer periphery while rotating the substrate at 500 to 5,000 rpm in a controlled manner.

Preferably, the recording layer thus formed has a dry thickness of about 500 to about 3,000 Å (=50 to 300 nm). Outside the range, the reflectivity would lower to render difficult read-out according to the CD standard. Increased modulation is expectable if the recording layer 3 has a thickness of at least 1,000 Å (=100 nm), especially 1,500 to 3,000 Å (=150 to 300 nm) in the recording track region within the groove 23.

For recording of CD signals, the recording layer 3 preferably has a coefficient of extinction (the imaginary part of a complex index of refraction) k of from 0.02 to 0.05 at the wavelength of recording and reading light. With a coefficient of extinction k of less than 0.02, the recording layer can have a lower absorptivity so that recording may required a greater power. A coefficient of extinction k of more than 0.05 can result in a drop of reflectivity to below 70%, often failing to allow reproduction according to the CD standard. The recording layer preferably has an index of refraction (the real part of a complex index of refraction) n of from 2.0 to 2.6 at the wavelength of recording and reading light. With n<2.0, reflectivity would be lower and read-out signals would be weaker, often failing to allow reproduction according to the CD standard. Few dyes having n>2.6 are available.

In determining n and k, a sample is prepared by forming a recording layer on a given transparent substrate to a thickness of about 40 to 100 nm. Then the reflectivity of the sample is measured through the substrate or from the recording layer side. Reflectivity is measured in a specular reflection mode (of the order of 5°) using light having the recording/reading wavelength. The transmittance of the sample is also measured. The index of refraction n and coefficient of extinction k may be calculated from these measurements according to Ishiguro Kozo, "Optics," Kyoritsu Publishing K.K., pages 168–178.

As shown in FIG. 1, the reflective layer 4 is closely disposed on the recording layer 3. The reflective layer may be formed of a high reflectivity metal such as Au and Cu or an alloy thereof. The reflective layer generally has a thickness of at least about 500 Å and may be formed by evaporation or sputtering. The upper limit of thickness is not critical, but is usually 1,200 Å from the standpoint of cost and deposition time. The reflective layer itself has a reflectivity of at least 90%, and the reflectivity of an unrecorded portion of an optical recording disc through the substrate can be at least 60%, especially at least 70%.

Closely disposed on the reflective layer 4 is the protective layer 5. The protective layer is preferably made of resins, for example, ultraviolet radiation cured resins and has a thickness of about 0.5 to about 100 μm. The protective layer may be a coated layer or a preformed sheet. The protective layer may be formed by conventional techniques such as spin coating, gravure coating, spray coating, and dipping.

In the optical recording disc 1 of the above-mentioned construction, signals are recorded or written once, typically by directing pulses of recording light of 780 nm to the recording layer 3 through the substrate 2 to define a spot on the recording layer to change its optical reflectivity. Upon exposure to recording light, the spot of the recording layer 3 absorbs the light to heat up whereby the substrate 2 is also heated. As a result, the dye and other recording layer materials can melt and decompose in the proximity of the interface between the substrate 2 and the recording layer 3 to stress the interface, resulting in deformation of the bottom and side wall of the groove. For recording, the substrate is generally rotated at a linear speed of about 1.2 to 1.4 m/s.

The present invention is not limited to the close contact type optical recording disc as in the illustrated embodiment, but applicable to any optical recording disc having a recording layer containing a dye. Equivalent results are obtained when the invention is applied to, for example, pit formation type optical recording discs of the air sandwich structure.

While the formazan metal complex dyes according to the present invention are useful as light-absorbing dyes or photo-stabilizers in the recording layer of optical recording media, they can also be used as photo-stabilizers for dyes in general applications, for example, in combination with pigments, dyestuffs, filter dyes, luminous dye materials and printing dyes for restraining photo-degradation thereof. The amount of the formazan metal complex dye used in such application may be approximately the same as in the recording layer of optical recording media.

EXAMPLE

Examples of the invention are given below by way of illustration and not by way of limitation.

Example 1

Synthesis of compound No. 1-43

Synthesis of ligand intermediate (benzaldehyde-2-pyridylhydrazone)

In 20 ml of ethanol was dissolved 5.46 g of 2-hydrazinopyridine. With stirring, 5.32 g of benzaldehyde was added to the solution. With heat release, pale yellow crystals precipitated within about 30 seconds and the entire solution solidified after one minute. 10 ml of ethanol was added to the mass which was refluxed at 100° C. for 40 minutes. The reaction solution was allowed to cool at room temperature and further cooled down to 10° C. to cause crystals to precipitate. The crystals were collected by suction filtration, washed with ethanol and dried in vacuum at room temperature for one hour, obtaining 8.28 g (yield 83%) of pale yellow acicular crystals.

Synthesis of ligand (1-(2-pyridyl)-3,5-diphenylformazan)

In 10 ml of 1.5N hydrochloric acid was dissolved 0.47 g of aniline. While cooling at 3° to 5° C. with an ice bath, 0.35 g of sodium nitrite in 3 ml of water was slowly added to the solution to form a diazonium salt. While the aqueous solution of diazonium salt was maintained at a temperature of up to 5° C., 0.69 g of sodium hydroxide in 5 ml of water was gradually added to the solution to turn the solution alkaline. The solution became turbid near neutrality and yielded a brown precipitate in an alkaline condition.

In a mixture of 10 ml of dioxane and 20 ml of ethanol was dissolved 0.99 g of benzaldehyde-2-pyridylhydrazone. The solution was cooled at 3° to 5° C. and the alkaline suspension of the diazonium salt was slowly added thereto. The solution turned red brown. While sodium hydroxide was added at intervals so as to always maintain pH 11 or higher, agitation was continued for one hour. As the reaction proceeded, a brown solid deposited on the wall of the reactor and crystals having a green metallic luster precipitated at the solution surface.

A small amount of acetic acid was added to the reaction solution to cause a dark brown precipitate to deposit. The precipitate was collected by suction filtration, washed with water, and air dried on the funnel. This crude formazan ligand was purified by recrystallization from hot ethanol, followed by washing with a small amount of ethanol and vacuum drying for 30 minutes. There was obtained 0.76 g (yield 77%) of acicular crystals having a dark green metallic luster.

The resulting ligand was subject to elemental analysis. Its molecular weight was determined by mass analysis according to secondary ion mass spectroscopy (SIMS). The results are shown below.

Elemental analysis

|  | C | H | N |
|---|---|---|---|
| Calcd. (%) | 71.74 | 5.02 | 23.24 |
| Found (%) | 71.83 | 5.27 | 22.98 |

Mass analysis: 300 (M–1$^+$)

Synthesis of nickel complex

In 10 ml of dioxane was dissolved 0.60 g (2 mmol) of the above synthesized ligand. With 0.25 g (1 mmol) of nickel acetate tetrahydrate added, the solution was agitated for 5 minutes. The solution instantaneously turned blue purple. 100 ml of water was added to the dioxane solution to cause the complex to precipitate, which was collected by suction filtration. This crude product was washed with water and then with a small amount of ethanol and dried in vacuum at 60° C. for one hour. There was obtained 0.61 g (yield 92%) of the end product having a red purple metallic luster.

This formazan nickel complex was subject to quantitative determination of Ni. Its molecular weight was determined by mass analysis according to fast atom bombardment (FAB) mass spectrometry. The results are shown below.

Ni analysis: Calcd. (%): 8.90 Found (%): 9.12

Mass analysis: 659 (M$^+$)

Maximum absorption wavelength: 610 nm

Example 2:

Synthesis of compound No. 1-44

Synthesis of ligand intermediate (benzaldehyde-(5-nitro-2-pyridyl)hydrazone)

In 20 ml of ethanol were dispersed 1.59 g of 2-hydrazino-5-nitropyridine and 1.13 g of benzaldehyde. The dispersion was refluxed at 100° C. for 16.5 hours. The reaction solution was allowed to cool at room temperature. The resulting precipitate was collected by suction filtration, washed with ethanol and air dried, obtaining 1.55 g (yield 62%) of orange yellow fine acicular crystals.

Synthesis of ligand (1-(5-nitro-2-pyridyl)-3,5-diphenylformazan)

In 6 ml of 3N hydrochloric acid was dissolved 0.49 g of aniline. While cooling at 3° to 5° C. with an ice bath, 0.37 g of sodium nitrite in 3 ml of water was slowly added to the solution to form a diazonium salt.

In a mixture of 100 ml of dioxane and 50 ml of ethanol was dispersed 1.28 g of benzaldehyde-(5-nitro-2-pyridyl)hydrazone. With 1.55 g of potassium hydroxide added, the dispersion was agitated while cooling at 5° C. or lower with an ice bath. The yellow suspension slowly turned into a red solution. While the solution was cooled at 3° to 5° C., the diazonium salt was slowly added dropwise thereto for coupling reaction. The solution quickly turned purple. After all the diazonium salt was added, the reaction solution became red purple. Further 1.02 g of potassium hydroxide was added to the solution, which was agitated for 2 hours in an ice bath.

Acetic acid was added to the reaction solution to be weakly acidic and water was added to cause a red brown precipitate to deposit. The precipitate was collected by suction filtration, washed with water, and air dried on the funnel. The crude formazan ligand was purified by recrystallization from dioxane, obtaining 0.54 g (yield 29%) of red brown acicular crystals.

The resulting ligand was subject to elemental analysis. Its molecular weight was determined by mass analysis according to SIMS. The results are shown below.

Elemental analysis

|  | C | H | N |
|---|---|---|---|
| Calcd. (%) | 61.42 | 4.07 | 24.26 |
| Found (%) | 62.33 | 4.01 | 24.34 |

Mass analysis: 345 (M–1$^+$)

Synthesis of nickel complex

In a mixture of 20 ml of methanol and 10 ml of dioxane were dispersed 0.52 g (0.5 mmol) of the above synthesized ligand and 0.18 g of nickel chloride hexahydrate. A small amount of sodium carbonate was added to the dispersion which was agitated for 30 minutes. The solution slowly turned blue. By suction filtration, the reaction solution was separated into a coppery brown solid and a yellow green filtrate. The solid was washed with methanol and dried in vacuum at 60° C. for one hour, obtaining 0.33 g (yield 59%) of the end product.

This formazan nickel complex was subject to quantitative determination of Ni. Its molecular weight was determined by mass analysis according to FAB mass spectrometry. The results are shown below.

Ni analysis: Calcd. (%): 7.83 Found (%): 7.67

Mass analysis: 749 (M$^+$)

Maximum absorption wavelength: 643 nm (in $CH_2Cl_2$)

Example 3:

Synthesis of compound No. 1-45

Synthesis of ligand intermediate (4-isopropylbenzaldehyde-(5-nitro-2-pyridyl)hydrazone)

In 50 ml of ethanol were dispersed 3.03 g of 2-hydrazino-5-nitropyridine and 3.08 g of 4-isopropylbenzaldehyde. The dispersion was refluxed at 90° C. for one hour. The reaction solution was allowed to cool at room temperature and further cooled down to 5° to 10° C. to cause crystals to fully precipitate, which were collected by suction filtration. The crystals were washed with a small amount of ethanol and dried in vacuum at 60° C. for 1.5 hours, obtaining 3.51 g (yield 62%) of dark yellow acicular crystals.

Synthesis of ligand (1-(5-nitro-2-pyridyl)-3-(4-isopropylphenyl)-5-phenylformazan)

In 10 ml of 1.5N hydrochloric acid was dissolved 0.54 g of aniline. While cooling at 3 to 4° C. with an ice bath, 0.38 g of sodium nitrite in 3 ml of water was slowly added to the solution to form a diazonium salt.

In a mixture of 40 ml of dioxane and 20 ml of ethanol was dispersed 1.42 g of 4-isopropylbenzaldehyde-(5-nitro-2-pyridyl)hydrazone. With 1.94 g of potassium hydroxide added, the dispersion was agitated while cooling at 10° C. or lower with an ice bath. The yellow suspension slowly turned into a red solution. While the solution was cooled at 3° to 5° C., the diazonium salt was slowly added dropwise thereto over about 20 minutes for coupling reaction. After the completion of addition, the solution agitated for a further 2.5 hours in an ice bath.

Acetic acid was added to the reaction solution to be weakly acidic and water was added to cause a black brown precipitate to deposit. The solution was allowed to stand overnight. The precipitate was collected by suction filtration, washed with water, and air dried on the funnel. The crude formazan ligand was purified by recrystallization from hot ethanol, obtaining 0.74 g (yield 38%) of dark red brown acicular crystals.

The resulting ligand was subject to elemental analysis. Its molecular weight was determined by mass analysis according to SIMS. The results are shown below.

Elemental analysis

|  | C | H | N |
|---|---|---|---|
| Calcd. (%) | 64.94 | 5.19 | 21.64 |
| Found (%) | 64.82 | 4.98 | 21.36 |

Mass analysis: 387 (M–1$^+$)

Synthesis of nickel complex

In a mixture of methanol and acetone was dissolved 0.39 g (1 mmol) of the above synthesized ligand. With 0.12 g (0.5 mmol) of nickel chloride hexahydrate added, the solution was agitated. The solution instantaneously turned blue. A small amount of water was added to the solution to cause the complex to precipitate, which was collected by suction filtration. This crude product was washed with water and then with a small amount of methanol and air dried. The crude nickel complex was purified by silica gel-dichloromethane column chromatography. The solution was evaporated to dryness by means of a rotary evaporator. The solid was dried in vacuum at 80° C. for one hour, obtaining 0.12 g (yield 29%) of the end product.

This formazan nickel complex was subject to quantitative determination of Ni. Its molecular weight was determined by mass analysis according to FAB mass spectrometry. The results are shown below.

Ni analysis: Calcd. (%): 7.04 Found (%): 6.93

Mass analysis: 834 (M$^+$)

Maximum absorption wavelength: 655 nm (in $CH_2Cl_2$)

Example 4:

Synthesis of compound No. 1-103

Synthesis of ligand intermediate (isobutylaldehyde-(5-nitro-2-pyridyl)hydrazone)

In 50 ml of ethanol was dispersed 7.71 g of 2-hydrazino-5-nitropyridine. Isobutylaldehyde was added thereto. When the dispersion was agitated for about 1 or 2 minutes, the entire dispersion crystallized and solidified with heat release. The mass was heated in an oil bath at 110° C. whereupon the entire mass melted into a uniform brown solution. It was refluxed for 30 minutes.

The reaction solution was allowed to cool and the resulting crystals were collected by suction filtration. Water was added to the filtrate to cause crystals to precipitate, which were also collected by suction filtration. The crystals were combined and washed with a small amount of ethanol, obtaining 7.36 g (yield 71%) of pale yellow soft acicular crystals.

Synthesis of ligand (1-(5-nitro-2-pyridyl)-3-isopropyl-5-phenylformazan)

In 25 ml of 5N hydrochloric acid was dissolved 4.24 g of aniline. While cooling at 5° to 7° C. with an ice bath, 3.18 g of sodium nitrite in 10 ml of water was slowly added to the solution to form a diazonium salt. After the completion of addition, the solution was agitated for a further 15 minutes. While the solution was cooled at 5 to 7° C., an aqueous diluted potassium hydroxide solution was slowly added dropwise thereto for adjustment to pH 8. At this point, the solution became reddish and thereafter a brown precipitate deposited.

In a mixture of 20 ml of ethanol and 20 ml of dioxane was dissolved 7.36 g of isobutylaldehyde-(5-nitro-2-pyridyl)hydrazone. While cooling with an ice bath, 10 g of potassium hydroxide was added to the solution which was agitated. The reaction solution quickly turned red and a red precipitate slowly deposited. The suspension was vigorously agitated while cooling at 5° to 7° C., and the weakly alkaline aqueous solution of diazonium salt was slowly added thereto. As the diazonium salt solution was added, the red suspension turned purple. While cooling, the suspension was agitated for 2.5 hours.

A small amount of acetic acid was added to the suspension for neutralization to cause a precipitate to deposit. The precipitate was collected by suction filtration and washed with a small amount of ethanol and then water. Vacuum drying at 80° C. for one hour gave 7.37 g (yield 67%) of a red brown powder. The product was examined for purity by thin layer chromatography (silica gel-dichloromethane) to find a single spot.

The resulting ligand was subject to elemental analysis. Its molecular weight was determined by mass analysis according to SIMS. The results are shown below.

Elemental analysis

|  | C | H | N |
|---|---|---|---|
| Calcd. (%) | 57.68 | 5.16 | 26.91 |
| Found (%) | 57.51 | 4.88 | 26.73 |

Mass analysis: 311 (M–1$^+$)

Synthesis of nickel complex

In a mixture of 20 ml of ethanol and 10 ml of dioxane was dissolved 7.28 g (23 mmol) of the ligand, 1-(5-nitro-2-pyridyl)-3-isopropyl-5-phenylformazan. With 2.80 g (12 mmol) of nickel chloride hexahydrate in 10 ml of ethanol added, the solution was agitated. The solution instantaneously turned blue green. 200 ml of water was added to the solution to cause a complex to precipitate, which was collected by suction filtration, washed with water until the filtrate became transparent, and then with a small amount of ethanol. The complex was dried in vacuum at 80° C. for 3 hours, obtaining 3.50 g (yield 44%) of the powder having a coppery brown metallic luster.

This formazan nickel complex was subject to quantitative determination of Ni. Its molecular weight was determined by mass analysis according to FAB mass spectrometry. The results are shown below.

Ni analysis: Calcd. (%): 8.61 Found (%): 8.54
Mass analysis: 681 (M$^+$)
Maximum absorption wavelength: 603 nm Example 5

Synthesis of compound No. 1-87

Synthesis of ligand intermediate (4-isopropylbenzaldehyde-2-pyridylhydrazone)

In 20 ml of ethanol was dissolved 5.46 g of 2-hydrazinopyridine. With 7.41 g of 4-isopropylbenzaldehyde added, the solution was agitated. Fine crystals started precipitating within about 30 seconds and the entire solution solidified within about 1 minute. 10 ml of ethanol was added to the mass, which was refluxed at 100° C. for 40 minutes. The reaction solution was allowed to cool at room temperature and further cooled down to 5° to 10° C. to cause crystals to fully precipitate, which were collected by suction filtration. The crystals were washed with ethanol and dried in vacuum for 40 minutes, obtaining 9.09 g (yield 76%) of pale yellow acicular crystals.

Synthesis of ligand (1-(2-pyridyl)-3,5-diphenylformazan)

With heating, 2.76 g of p-nitroaniline was fully dissolved in 20 ml of 3N hydrochloric acid. The solution was cooled at 5° C. or lower with an ice bath. While cooling at 3° to 4° C., 1.36 g of sodium sulfite in 3 ml of water was slowly added to the solution to form a diazonium salt.

In a mixture of 30 ml of dioxane and 30 ml of ethanol was dissolved 4.78 g of 4-isopropylbenzaldehyde-2-pyridylhydrazone. With 5.45 g of potassium hydroxide added, the dispersion was agitated while cooling at 10° C. or lower with an ice bath. While the solution was cooled at 3° to 5° C., the diazonium salt was slowly added dropwise thereto over about 20 minutes for coupling reaction. After the completion of addition, the solution was agitated for a further 1 hour.

Acetic acid was added to the reaction solution for neutralization and water was added to cause a brown precipitate to deposit. The solution was allowed to stand overnight. The precipitate was collected by suction filtration, washed with water, and air dried on the funnel. The crude formazan ligand was purified by recrystallization from hot ethanol, obtaining 3.34 g (yield 43%) of red brown acicular crystals.

The resulting ligand was subject to elemental analysis. Its molecular weight was determined by mass analysis according to SIMS. The results are shown below.

Elemental analysis

|  | C | H | N |
|---|---|---|---|
| Calcd. (%) | 64.94 | 5.19 | 21.64 |
| Found (%) | 65.14 | 5.01 | 21.67 |

Mass analysis: 387 (M–1$^+$)

Synthesis of nickel complex

In a mixture of methanol and dioxane was dissolved 0.78 g (2 mmol) of the above synthesized ligand. With 0.24 g (1 mmol) of nickel chloride hexahydrate added, the solution was agitated. The solution instantaneously turned blue. A small amount of water was added to the solution to cause the complex to precipitate, which was collected by suction filtration. This crude product was washed with water and then with a small amount of ethanol and air dried. The crude nickel complex was purified by silica gel-dichloromethane column chromatography. Vacuum drying at 80° C. for 2 hours gave 0.51 g (yield 61%) of the end product.

This formazan nickel complex was subject to quantitative determination of Ni. Its molecular weight was determined by mass analysis according to FAB mass spectrometry. The results are shown below.

Ni analysis: Calcd. (%): 7.04 Found (%): 6.86

Mass analysis: 834 (M$^+$)

Maximum absorption wavelength: 642 nm (in $CH_2Cl_2$)

Example 6

Synthesis of compound No. 4-6

Synthesis of ligand intermediate (4-tert-butylbenzaldehyde-phenylhydrazone)

In 20 ml of methanol was dissolved 2.18 g of phenylhydrazine. While metering, 3.24 g of 4-tert-butylbenzaldehyde was added dropwise to the solution. Reaction quickly took place. With heat release, the entire solution solidified. 5 ml of ethanol was added to the mass and the crystals were washed and collected by suction filtration. The crystals were washed with a small amount of methanol and dried in vacuum for 1.5 hours, obtaining 4.69 g (yield 93%) of pale yellow crystals.

Synthesis of ligand (1-(5-nitro-2-thiazolyl)-3-(4-tertbutylbenzaldehyde)-5-phenylformazan).

In a mixed acid of 3 ml of propionic acid and 17 ml of acetic acid was dissolved 1.45g of 5-nitro-2-aminothiazole. In 20 ml of the same mixed acid was dissolved 7.0 g of 45% nitrosylsulfuric acid. While cooling at 2° to 4° C. with an ice bath, the 5-nitro-2-aminothiazole solution was slowly added to the acid mixture. After agitation for one hour, 1.79 g of sodium sulfamate was added to the solution to decompose the excess nitrite residue.

In a mixture of 10 ml of dioxane and 20 ml of ethanol was dissolved 2.52 g of 4-tert-butylbenzaldehyde-phenyl-hydrazone. With 2.11 g of sodium hydroxide added, the solution was agitated while cooling at 5° C. or lower. While cooling at 3° to 5° C., the solution of the diazonium salt of 5-nitro-2-aminothiazole was slowly added to this solution. While sodium hydroxide was added at intervals so as to always maintain pH 11 or higher, agitation was continued for 2 hours.

A small amount of acetic acid was added to the reaction solution for neutralization and water was added to cause a dark brown precipitate to deposit. The precipitate was collected by suction filtration, washed with water, and air dried on the funnel. The crude formazan ligand was purified by recrystallization from hot ethanol, followed by washing with a small amount of ethanol and vacuum drying for one hour. There was obtained 1.12 g (yield 28%) of red brown acicular crystals.

The resulting ligand was subject to elemental analysis. Its molecular weight was determined by mass analysis according to SIMS. The results are shown below.

Elemental analysis

|  | C | H | N |
|---|---|---|---|
| Calcd. (%) | 57.56 | 5.08 | 21.20 |
| Found (%) | 57.37 | 5.11 | 20.86 |

Mass analysis: 395 (M–1$^+$)

Synthesis of nickel complex

In 10 ml of methanol was dissolved 0.79 g (2 mmol) of the above synthesized ligand. With 0.25 g (1 mmol) of nickel acetate tetrahydrate added, the solution was agitated for 5 minutes. The solution instantaneously turned blue. 50 ml of water was added to the solution to cause the complex to precipitate, which was collected by suction filtration. This crude product was washed with water and then with a small amount of methanol and dried in vacuum at 80° C. for one hour. There was obtained 0.74 g (yield 87%) of the end product having a red purple metallic luster.

This formazan nickel complex was subject to quantitative determination of Ni. Its molecular weight was determined by mass analysis according to FAB mass spectrometry. The results are shown below.

Ni analysis: Calcd. (%): 6.56 Found (%): 6.42

Mass analysis: 850 (M$^+$)

Maximum absorption wavelength: 635 nm

Example 7

Synthesis of compound No. 4-9

Synthesis of ligand intermediate (piperonal-(4-nitrophenyl)hydrazone)

In 20 ml of methanol was dissolved 3.06 g of 4-nitrophenylhydrazine. With 3.00 g of piperonal added, the solution was refluxed at 100° C. for one hour. With the progress of reaction, crystals gradually precipitated. The crystals were collected by suction filtration, washed with methanol and dried at 80° C. for 2 hours, obtaining 3.60 g (yield 71%) of pale yellow crystals.

Synthesis of ligand (1-(2-thiazolyl)-3-piperonal-5-(4-nitrophenyl)formazan)

In 10 ml of 3N hydrochloric acid was dissolved 1.00 g of 2-aminothiazole. While cooling at 3° to 4° C. with an ice bath, 0.76 g of sodium nitrite in 3 ml of water was slowly added to the solution to form a diazonium salt.

In a mixture of 20 ml of dioxane and 10 ml of ethanol was dissolved 2.53 g of piperonal-(4-nitrophenyl)hydrazone. With 2.82 g of potassium hydroxide added, the solution was agitated while cooling at 5° C. or lower. While cooling at 3° to 5° C., the diazonium salt solution was slowly added to this solution. The reaction solution turned blue purple. While potassium hydroxide was added at intervals so as to always maintain pH 11 or higher, agitation was continued for 2 hours.

A small amount of acetic acid was added to the reaction solution for neutralization and water was added to cause a red brown precipitate to deposit. The precipitate was collected by suction filtration, washed with water, and air dried on the funnel. The crude formazan ligand was purified by recrystallization from hot ethanol, followed by washing with a small amount of ethanol and vacuum drying for 2 hours. There was obtained 1.35 g (yield 37%) of acicular crystals.

The resulting ligand was subject to elemental analysis. Its molecular weight was determined by mass analysis according to SIMS. The results are shown below.

Elemental analysis

|  | C | H | N |
|---|---|---|---|
| Calcd. (%) | 56.04 | 3.32 | 23.06 |
| Found (%) | 56.11 | 3.54 | 22.99 |

Mass analysis: 363 (M–1$^+$)

Synthesis of nickel complex

In 10 ml of dioxane was dissolved 0.73 g (2 mmol) of the above synthesized ligand. With 0.25 g (1 mmol) of nickel acetate tetrahydrate added, the solution was agitated for 10 minutes. The solution instantaneously turned blue. 150 ml of water was added to the solution to cause the complex to precipitate, which was collected by suction filtration. This crude product was washed with water and then with a small amount of methanol and dried in vacuum at 80° C. for one hour. There was obtained 0.73 g (yield 93%) of the end product having a red purple metallic luster.

This formazan nickel complex was subject to quantitative determination of Ni. Its molecular weight was determined by mass analysis according to FAB mass spectrometry. The results are shown below.

Ni analysis: Calcd. (%): 7.47 Found (%): 7.33

Mass analysis: 785 ($M^+$)

Maximum absorption wavelength: 626 nm

Example 8

Synthesis of compound No. 4-23

Synthesis of copper complex

In 10 ml of dioxane was dissolved 0.79 g (2 mmol) of the ligand synthesized in Example 6, 1-(5-nitro-2-thiazolyl)-3-(4-tert-butylbenzaldehyde)-5-phenylformazan. With 0.36 g (2 mmol) of anhydrous copper acetate added, the solution was agitated for 5 minutes. The solution instantaneously turned blue. Sodium tetrafluoroborate, 0.33 g, was added to the solution which was agitated for 10 minutes. Further 100 ml of water was added to the solution to cause the complex to precipitate, which was collected by suction filtration. This crude product was washed with water and then with methanol. It was purified by recrystallization from dioxane, followed by hot vacuum drying at 80° C. for 2 hours. There was obtained 0.73 g (yield 87%) of the end product having a bronze luster.

This formazan copper complex was subject to quantitative determination of Cu. The results are shown below.

Cu analysis: Calcd. (%): 11.60 Found (%): 11.21

Maximum absorption wavelength: 637 nm

Example 9

Synthesis of compound No. 5-1

Synthesis of ligand intermediate (4-isopropylbenzaldehyde-(4-nitrophenyl)hydrazone).

In 20 ml of methanol was dissolved 3.06 g of 4-nitrophenylhydrazine. With 2.96 g of 4-isopropylbenzaldehyde added, the solution was refluxed at 100° C. for one hour. With the progress of reaction, crystals gradually precipitated. The crystals were collected by suction filtration, washed with methanol, and dried at 80° C. for 2 hours, obtaining 5.21 g (yield 92%) of pale yellow crystals.

Synthesis of ligand (1-(2-benzothiazolyl)-3-(4-isopropylphenyl)-5-(4-nitrophenyl)formazan).

In 10 ml of 3N hydrochloric acid was dissolved 1.50 g of 2-aminobenzothiazole. While cooling at 3° to 5° C. with an ice bath, 0.76 g of sodium nitrite in 3 ml of water was slowly added to the solution to form a diazonium salt.

In a mixture of 10 ml of dioxane and 10 ml of ethanol was dissolved 2.83 g of 4-isopropylbenzaldehyde-(4-nitrophenyl)hydrazone. With 2.73 g of potassium hydroxide added, the solution was agitated while cooling at 5° C. or lower. While the solution was cooled at 3° to 5° C., the diazonium salt solution was slowly added thereto. The reaction solution turned red purple. While potassium hydroxide was added at intervals so as to always maintain pH 11 or higher, agitation was continued for 1.5 hours.

A small amount of acetic acid was added to the reaction solution for neutralization and water was added to cause a red brown precipitate to deposit. The precipitate was collected by suction filtration, washed with water, and air dried on the funnel. The crude formazan ligand was purified by recrystallization from hot ethanol, followed by washing with a small amount of ethanol and vacuum drying at 80° C. for one hour. There was obtained 2.08 g (yield 47%) of acicular crystals.

The resulting ligand was subject to elemental analysis. Its molecular weight was determined by mass analysis according to SIMS. The results are shown below.

Elemental analysis

|  | C | H | N |
|---|---|---|---|
| Calcd. (%) | 62.15 | 4.53 | 18.91 |
| Found (%) | 62.36 | 4.33 | 19.05 |

Mass analysis: 444 ($M-1^+$)

Synthesis of nickel complex

In 10 ml of dioxane was-dissolved 0.89 g (2 mmol) of the above synthesized ligand. With 0.24 g (1 mmol) of nickel chloride hexahydrate added, the solution was agitated for 10 minutes. The solution instantaneously turned blue. 150 ml of water was added to the solution to cause the complex to precipitate, which was collected by suction filtration. This crude nickel complex was washed with water and then with a small amount of ethanol and dried in vacuum at 80° C. for 2 hours, obtaining 0.70 g (yield 74%) of the end product having a red purple metallic luster.

This formazan nickel complex was subject to quantitative determination of Ni. Its molecular weight was determined by mass analysis according to FAB mass spectrometry. The results are shown below.

Ni analysis: Calcd. (%): 6.21 Found (%): 5.98

Mass analysis: 946 ($M^+$)

Maximum absorption wavelength: 642 nm

Example 10

Synthesis of compound No. 5-5

Synthesis of ligand intermediate (piperonal-phenyl-hydazone).

In 40 ml of ethanol was dissolved 2.16 g of phenylhydrazine. With 3.00 g of piperonal added, the solution was refluxed at 100° C. for one hour. The solution was allowed to cool at room temperature. The resulting crystals were collected by suction filtration, washed with ethanol and dried in vacuum at 80° C. for 2 hours, obtaining 3.48 g (yield 82%) of pale yellow crystals.

Synthesis of ligand (1-(5-nitro-2-benzothiazolyl)-3-piperonal-5-phenylformazan)

In a mixed acid of 3 ml of propionic acid and 17 ml of acetic acid was dissolved 1.95 g of 2-amino-6-nitrobenzothiazole. In 20 ml of the same mixed acid was dissolved 7.0 g of 45% nitrosylsulfuric acid. While cooling at 3° to 5° C. with an ice bath, the 2-amino-6-nitrobenzothiazole solution was slowly added to the acid mixture. After agitation for one hour, 1.79 g of sodium sulfamate was added to the solution to decompose the excess nitrite residue.

In a mixture of 20 ml of dioxane and 10 ml of ethanol was dissolved 2.12 g of piperonal-phenylhydrazone. With 3.03 g of potassium hydroxide added, the solution was agitated while cooling at 5° C. or lower. While cooling at 3° to 5° C., the solution of the diazonium salt of 2-amino-6-nitrobenzothiazole was slowly added to this solution. While potassium hydroxide was added at intervals so as to always maintain pH 11 or higher, agitation was continued for 2 hours.

A small amount of acetic acid was added to the reaction solution for neutralization and water was added to cause a red brown precipitate to deposit. The precipitate was collected by suction filtration, washed with water and then with a small amount of ethanol, and air dried on the funnel. The crude formazan ligand was purified by recrystallization from hot ethanol, followed by washing with a small amount of ethanol and vacuum drying at 80° C. for one hour. There was obtained 1.37 g (yield 33%) of brown acicular crystals.

The resulting ligand was subject to elemental analysis. Its molecular weight was determined by mass analysis according to SIMS. The results are shown below.

Elemental analysis

|  | C | H | N |
| --- | --- | --- | --- |
| Calcd. (%) | 60.86 | 3.40 | 20.28 |
| Found (%) | 60.63 | 3.22 | 20.41 |

Mass analysis: 413 (M–1$^+$)

Synthesis of nickel complex

In 10 ml of methanol was dissolved 0.83 g (2 mmol) of the above synthesized ligand. With 0.24 g (1 mmol) of nickel chloride hexahydrate added, the solution was agitated for 10 minutes. The solution instantaneously turned blue. 50 ml of water was added to the solution to cause the complex to precipitate, which was collected by suction filtration. This crude product was washed with water and then with a small amount of ethanol and dried in vacuum at 80° C. for one hour. There was obtained 0.63 g (yield 71%) of the end product having a red purple metallic luster.

This formazan nickel complex was subject to quantitative determination of Ni. Its molecular weight was determined by mass analysis according to FAB mass spectrometry. The results are shown below.

Ni analysis: Calcd. (%): 6.63 Found (%): 6.57

Mass analysis: 886 (M$^+$)

Maximum absorption wavelength: 642 nm

In addition to the above-mentioned compounds, the remaining exemplified compounds (Nos. 1-1 to 13-5) were similarly synthesized and identified.

Example 11

Figure 2:
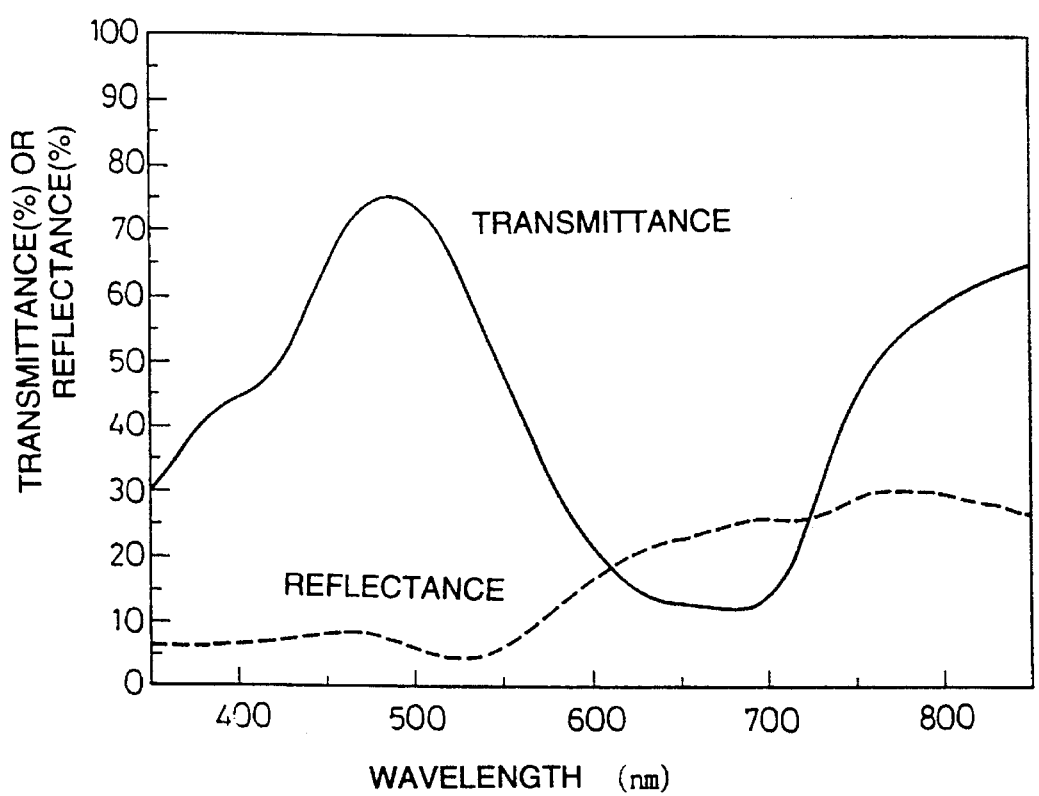
FIG. 2 is a graph showing transmission and reflection spectra of a formazan metal complex dye (No. 1-44) according to the invention.
Figure 3:
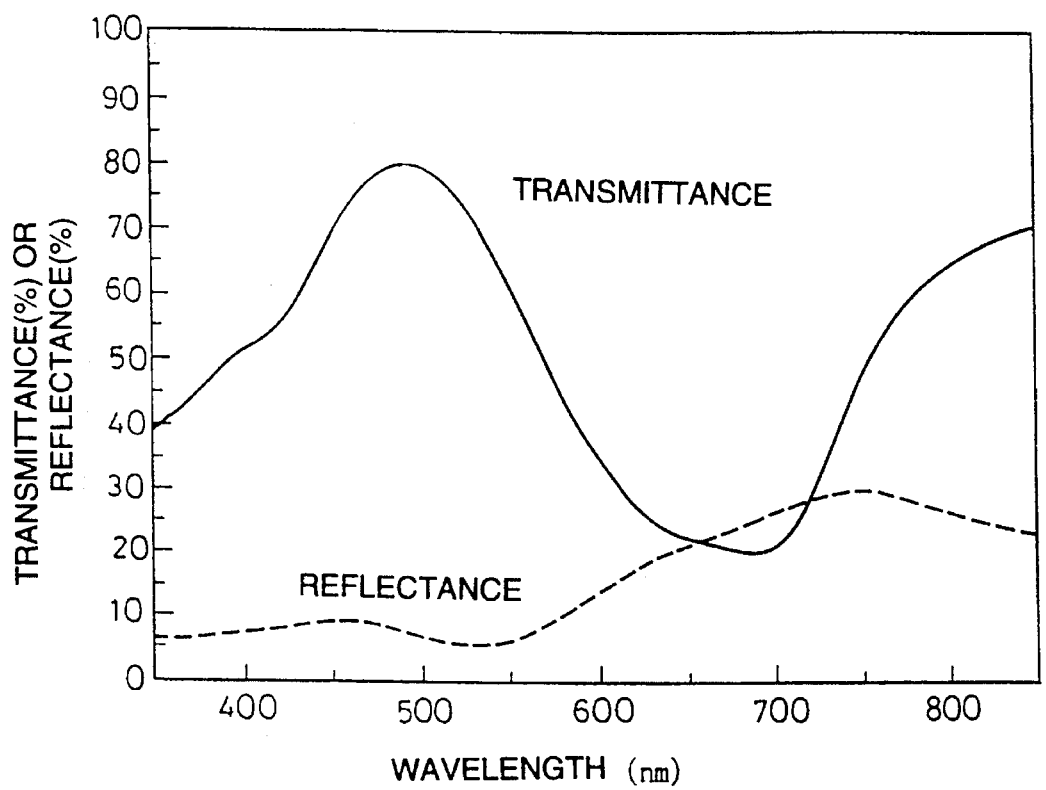
FIG. 3 is a graph showing transmission and reflection spectra of a formazan metal complex dye (No. 1-45) according to the invention.

The compounds synthesized in Examples 1 to 10 were examined for various properties. FIGS. 2 and 3 show the measurement results of transmission spectrum and reflection spectrum of compound Nos. 1-44 and 1-45, respectively. A sample for the spectral measurement was prepared by spin coating a 1-methoxy-2-propanol solution containing 2 wt % of the compound onto a glass substrate having a diameter of 50 mm and a thickness of 1.2 mm to form a thin film of 40 nm thick.

It is seen from FIGS. 2 and 3 that these compounds exhibit a constant, relatively high reflectance over a wide wavelength region (about 600 nm to about 800 nm). This suggests that these dyes can cope with not only an optical recording disc of the current CD standard at 780 nm, but also various lasers with the wavelength range of 450 to 700 nm and the next generation semiconductor lasers of shorter wavelength.

It is expected that the dyes experience a little change of their characteristics in response to variations and drifts of the oscillation wavelength of a laser.

Also those dyes of formulae (I), (II) and (III) wherein Y is an alkyl group having 4 to 18 carbon atoms or a branched alkyl group having 6 to 12 carbon atoms, as represented by compound No. 1-109, were examined for solubility in ethylcyclohexane, finding a solubility of about 0.5 to 5% by weight.

Example 12

An optical recording disc as shown in FIG. 1 was fabricated using compound No. 1-45 synthesized in Example 3 as a dye to form a recording layer.

There was furnished a pre-grooved substrate of polycarbonate resin having a diameter of 120 mm and a thickness of 1.2 mm which had a groove of 0.16 µm deep, 0.48 µm wide and 1.6 µm in pitch. By spin coating, a recording layer containing the dye was formed onto the substrate to a thickness of 2,000 Å (200 nm). The coating solution used herein was a solution containing 2% by weight of the dye in 1-methoxy-2-propanol. A reflective film of gold was formed on the recording layer to a thickness of 850 Å by sputtering. A transparent protective layer of UV-curing acrylic resin was formed thereon to a thickness of 5 µm.

Using a semiconductor laser having an oscillation wavelength of 780 nm, EFM-CD formatted signals were recorded in the thus fabricated optical recording disc at a linear velocity of 1.2 to 1.4 m/s to determine the optimum recording power. The optimum recording power is the range of recording power at which the asymmetry prescribed by Orange Book is −2% as measured by a meter used for recording evaluation (DDU-1000, Pulstech K.K.), that is, optimum readout signals are available. On this measurement, the optimum recording power was 4.3 to 5.6 mW, satisfying the standard of Orange Book.

Light resistance was examined by applying a solution containing 2% by weight of the dye in 1-methoxy-2-propanol to a glass substrate having a diameter of 50 mm and a thickness of 1.2 mm by spin coating to form a dye film of 40 nm thick. This sample was measured for initial transmittance To. The sample was exposed to a xenon lamp of 80,000 lux (Xenon Fadeometer manufactured by Shimazu Mfg. K. K.) and then measured for transmittance T again. The percent retention of the dye was calculated according to (100-T)/(100-To)×100%. The percent retention of the dye after 100 hour irradiation was about 95%. Light resistance was satisfactory For the above-mentioned optical recording disc and measurement sample, an attempt was made to form a dye film using the dye (shown below) disclosed in JP-A 144997/1987 instead of the inventive dye. This comparative dye was substantially insoluble in 1-methoxy-2-propanol, with a solubility of approximately 0 wt %, failing to prepared a coating solution of an appropriate dye concentration. A dye coating could not be formed.

Comparative dye:

Comparative dye:

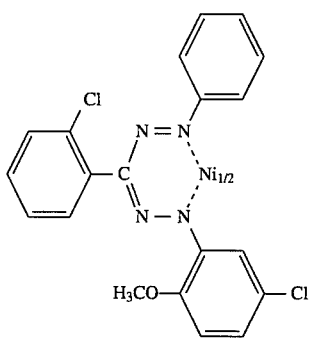

Example 13

In accordance with the optical recording disc and measurement sample of Example 12 using compound No. 1-45, an optical recording disc and measurement sample were similarly prepared using compound No. 1-103 as a dye to form a recording layer or dye film. They were similarly tested to find that the optical recording disc satisfied the standard of Orange Book and light resistance was satisfactory.

Example 14

In accordance with the optical recording disc and measurement sample of Example 12 using compound No. 1-45, an optical recording disc and measurement sample were similarly prepared. Using compound No. 1-109 as a dye and ethylcyclohexane as a solvent, a 1.5 wt % ethylcyclohexane solution was prepared to form a recording layer or dye film. They were similarly tested to find that the optical recording disc satisfied the standard of Orange Book and light resistance was satisfactory. Since an aliphatic hydrocarbon was used as the coating solvent, the evaporation rate was high enough to increase the number of spin coated films per unit time, eventually leading to a cost reduction. Also since the aliphatic hydrocarbon solvent took up less moisture from air upon evaporation, humidity management during spin coating was easier than with alcohol and cellosolve solvents.

It is evident from Examples 12 to 14 that formazan metal complex dyes of the invention are high soluble, easy to form a film, and light resistant and enables satisfactory recording with high sensitivity.

Similarly the dyes within the scope of the invention other than the above-illustrated ones enabled satisfactory recording insofar as they coped with recording/reading light of 780 nm.

These optical recording media were examined for reading characteristics, also satisfying the standard of Orange Book.

It is obvious that those dyes within the scope of the invention whose reflection does not cope with the wavelength of 780 nm will enable satisfactory recording/reading with high sensitivity if recording/reading light of a wavelength selected to match with a particular dye (for example, a laser with a wavelength of 450 to 700 nm and a semiconductor laser of the next generation with a shorter wavelength) is used.

Example 15

A mixture of the formazan nickel complex dye of compound No. 1-45 and a cyanine dye of the following formula (NK-3383, manufactured by Nihon Kanko Shikiso K.K.) was dissolved in 1-methoxy-2-propanol to a concentration of $2.5 \times 10^{-5}$ mol/liter.

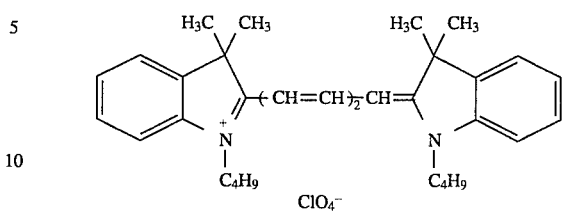

There were prepared a series of solutions wherein the amount of compound No. 1-45 added was 10 mol %, 20 mol %, 30 mol %, and 50 mol % of the moles of the cyanine dye. A solution containing only the cyanine dye was also prepared.

Each of the solutions was spin coated onto a polycarbonate resin substrate of 120 mm in diameter which was rotated at 1,300 rpm, forming a dye film of 40 nm thick. Five samples were prepared in this way. These samples were examined for light resistance by the same procedure as in Example 12. The percent retention of the dye after a light exposure time of 0, 15, 30, 50, 75, and 100 hours was determined. The results are shown in Table 1.

TABLE 1

| Amount of No. 1-45 added (mol %) | Dye retention (%) Light exposure time (hr.) | | | | | |
|---|---|---|---|---|---|---|
| | 0 | 15 | 30 | 50 | 75 | 100 |
| 0 | 100 | 64.7 | 10.6 | ~0 | ~0 | ~0 |
| 10 | 100 | 97.6 | 95.4 | 92.7 | 89.3 | 86.1 |
| 20 | 100 | 98.2 | 96.6 | 94.6 | 92.2 | 90.9 |
| 30 | 100 | 98.1 | 96.4 | 94.5 | 92.4 | 90.5 |
| 50 | 100 | 97.8 | 95.9 | 93.4 | 90.9 | 88.3 |

As is evident from Table 1, the formazan nickel complex dyes within the scope of the invention are effective for restraining photo-degradation of cyanine dyes. Satisfactory results are obtained when they are added in amounts of about 10 mol % or more. Like the formazan nickel complex dyes used herein, the remaining formazan metal complex dyes within the scope of the invention were effective for restraining photo-degradation. They are also effective for restraining photo-degradation of dyes other than the cyanine dyes, for example, azo dyes and phthalocyanine dyes, especially tetra- to octaphenoxy substituted, tetra- to octaphenyl substituted, tetra- to octa(o-alkyl)phenyl substituted and tetra- to octaalkoxy substituted phthalocyanine dyes having as the center atom Si (preferably, two ligands such as alkoxy, siloxy or phosphate derivative groups coordinate at axial positions), Al (preferably, one ligand such as alkoxy, siloxy or phosphate derivative group coordinates at an axial position), Cu, Ni, Co, Fe, Pd, and VO.

Example 16

A mixture of the formazan nickel complex dye of compound No. 1-45 and a cyanine dye of the following formula (NK-3614, manufactured by Nihon Kanko Shikiso K.K.) wherein the amount of compound No. 1-45 added was 10 mol % of the moles of the cyanine dye was dissolved in 1-methoxy-2-propanol to a concentration of $2.5 \times 10^{-5}$ mol/liter.

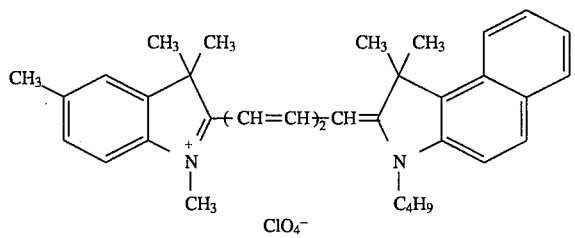

A 1-methoxy-2-propanol solution was similarly prepared except that bis(phenylenedithiol) copper complex of the following formula was used instead of compound No. 1-45.

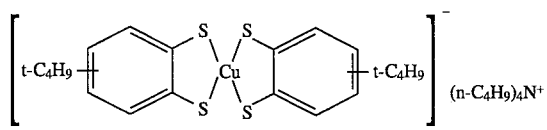

Using these solutions, samples were prepared as in Example 15 and the percent retention of the dye after 30-hour exposure was similarly determined. As a result, the percent retention of the cyanine dye was 84.3% for compound No. 1-45 and 14.1% for bis(phenylenedithiol) copper complex. It is evident that the formazan nickel complex dye within the scope of the invention is more effective for restraining photo-degradation of the dye.

Similar photo-degradation restraining effect was found for the remaining formazan metal complex dyes within the scope of the invention.

Example 17

Optical recording discs were fabricated as in Example 12 except that the solution containing compound No. 1-45 and the cyanine dye and the solution containing bis(phenylenedithiol) copper complex and the cyanine dye, both prepared in Example 16, were used. These optical recording discs met the standard of Orange Book while the optical recording disc using compound No. 1-45 within the scope of the invention showed better performance.

The discs were also examined for electrical properties after they were kept at 80° C. and RH 80% for 100 hours, finding that the optical recording disc using compound No. 1-45 performed better.

Similar tendency was found for the remaining formazan metal complex dyes within the scope of the invention.

Example 18

The optical recording disc of Example 12 using compound No. 1-45 in the recording layer, the optical recording disc of Example 17 using the cyanine dye and compound No. 1-45 in the recording layer, and the optical recording disc of Example 17 using the cyanine dye and the bis(phenylenedithiol) copper complex in the recording layer were compared with respect to electrical properties. The electrical properties examined were reflectivity (Rtop) and modulation ($I_{11}$mod) as prescribed in the standard of Orange Book. Pit jitter and Cl error were also examined. The electrical property of an optical recording disc was compared by determining the property before and after exposure of the disc through the substrate to a xenon lamp (80,000 lux) for 50 hours and calculating a percent change. The results are shown in Table 2.

TABLE 2

| Recording layer composition | Percent change | | | |
|---|---|---|---|---|
| | Rtop | $I_{11}$mod | Pit jitter | Cl error |
| No. 1-45 | −0.5 | 1.3 | 0.0 | 0.0 |
| Cyanine dye + No. 1-45 | −0.8 | 2.3 | −0.2 | 0.0 |
| Cyanine dye + bis(phenylenedithiol) Cu | −23.3 | 6.5 | 0.7 | 17.9 |

It is evident from Table 2 that the optical recording disc within the scope of the invention experiences less losses of electrical properties by light than the optical recording disc using the conventional cyanine dye and bis(phenylenedithiol) copper complex in the recording layer.

Similar tendency was found for the remaining formazan metal complex dyes within the scope of the invention.

BENEFITS OF THE INVENTION

There has been described an optical recording medium which uses a high solubility formazan metal complex dye as a light absorbing dye and exhibits high sensitivity, especially high recording sensitivity, and improved light resistance. High reflectivity is available over a wide wavelength range. The recording medium thus can cope with laser light of the currently available wavelength as well as laser light of shorter wavelength expected of development in the near future. The recording medium is stable to variations and drifts of the oscillation wavelength of a laser.

The formazan metal complex dye can be used as a photo-stabilizer to ensure an optical recording medium having improved light resistance and high performance.

The formazan metal complex dye is effective for stabilizing conventional dyes against light.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording medium having a recording layer comprising at least one dye selected from formazan metal complex dyes of the following general formulae (I) and (II):

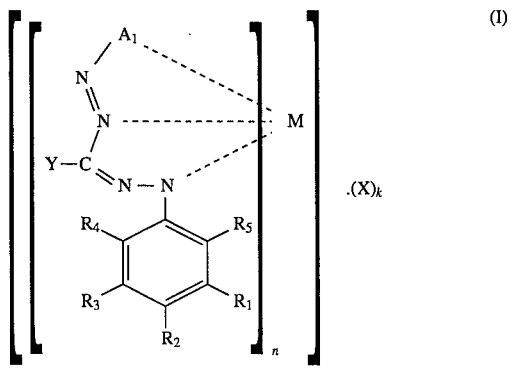

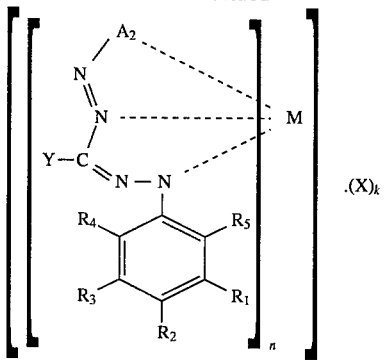 (II)

wherein

M is a divalent metal atom, $A_1$ is a group represented by

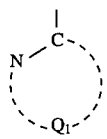 $A_1$ wherein $Q_1$ is a group of atoms necessary to form with C and N a five or six-membered heteroaromatic ring which may have a fused ring, $A_2$ is a group represented by $A_{21}$ or $A_{22}$:

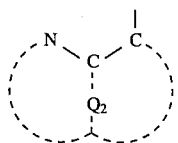 $A_{21}$

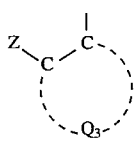 $A_{22}$ wherein $Q_2$ is a group of atoms necessary to form with C and N a nine or ten-membered heteroaromatic ring which may have a fused ring, $Q_3$ is a group of atoms necessary to form with C a five or six-membered heteroaromatic ring or benzene ring which may have a fused ring, Z is selected from the group consisting of an oxy (—O—), thio (—S—), imino (—NH—), oxycarbonyl (—O—CO—), iminocarbonyl (—NH—CO—), and iminosulfonyl (—NH—SO$_2$—) group, each of $A_1$, $A_{21}$ and $A_{22}$ at its C is attached to N in the formazan skeleton, each of $A_1$ and $A_{21}$ at its N coordinates to M, and $A_{22}$ at its Z coordinates to M, Y is selected from the group consisting of an aromatic, alkyl, acyl, alkoxycarbonyl, cyano, nitro, alkoxy and alkylthio group, $R_1$, $R_2$, $R_3$, $R_4$, and $R_5$ are independently selected from the group consisting of a hydrogen atom, alkyl group, alkoxy group, nitro group, cyano group, halogen atom, aryl group, aryloxy group, acyl group, alkoxycarbonyl group, carbamoyl group, and amino group, at least one of $R_4$ and $R_5$ is a hydrogen atom, n representing the number of formazan ligands coordinating to M is equal to 1 or 2, X is a counter ion to the formazan metal complex, k is a number necessary to provide a balance of electric charge, and the broken lines in formulae (I) and (II) represent coordinate bonds to M.

2. The optical recording medium of claim 1 wherein M is selected from the group consisting of Fe, Co, Ni, Cu, Zn, and Pd.

3. The optical recording medium of claim 1 wherein the five or six-membered heteroaromatic ring which is formed by $Q_1$ in $A_1$ and which may have a fused ring is selected from the group consisting of a pyridine ring, thiazole ring, benzothiazole ring, oxazole ring, benzoxazole ring, and isoquinoline ring.

4. The optical recording medium of claim 1 wherein the nine or ten-membered heteroaromatic ring which is formed by $Q_2$ in $A_{21}$ and which may have a fused ring is a quinoline ring.

5. The optical recording medium of claim 1 wherein the ring formed by $Q_3$ in $A_{22}$ is a benzene ring.

6. The optical recording medium of claim 1 wherein $A_1$ or $A_{21}$ is selected.

7. The optical recording medium of any one of claims 1 to wherein said recording layer further contains a light absorbing dye.

8. The optical recording medium of claim 7 wherein said light absorbing dye is a cyanine dye.

9. An optical recording medium having a recording layer comprising at least one dye selected from formazan metal complex dyes of the following general formula (III):

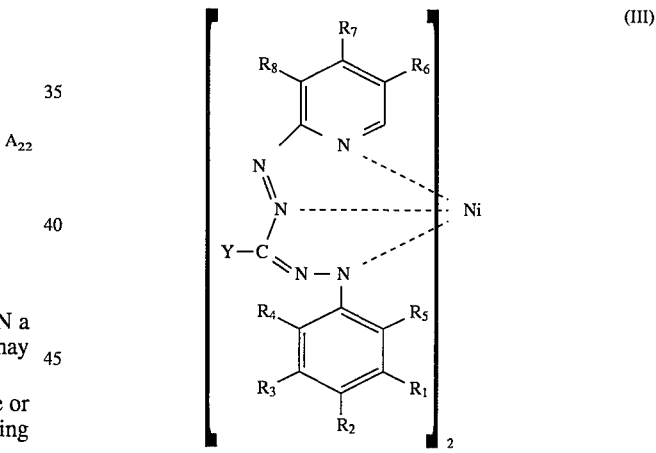 (III)

wherein

Y is selected from the group consisting of an aromatic, alkyl, acyl, alkoxycarbonyl, cyano, nitro, alkoxy and alkylthio group, $R_1$, $R_2$, $R_3$, $R_4$, and $R_5$ are independently selected from the group consisting of a hydrogen atom, alkyl group, alkoxy group, nitro group, cyano group, halogen atom, aryl group, aryloxy group, acyl group, alkoxycarbonyl group, carbamoyl group, and amino group, at least one of $R_4$ and $R_5$ is a hydrogen atom, $R_6$, $R_7$, and $R_8$ are independently selected from the group consisting of a hydrogen atom, halogen atom, nitro group, alkyl group, and cyano group, and the broken lines in formula (III) represent coordinate bonds to Ni.

10. A method for photo-stabilizing a dye with a dye selected from formazan metal complex dyes of the following general formulae (I) and (II):

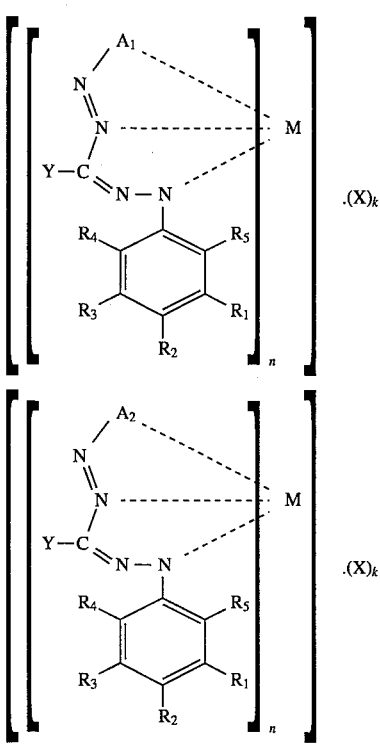

.(X)$_k$ (I)

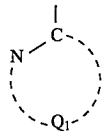

.(X)$_k$ (II)

wherein

M is a divalent metal atom,

A$_1$ is a group represented by

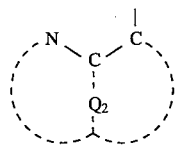  A$_1$ wherein

Q$_1$ is a group of atoms necessary to form with C and N a five or six-membered heteroaromatic ring which may have a fused ring, A$_2$ is a group represented by A$_{21}$ or A$_{22}$:

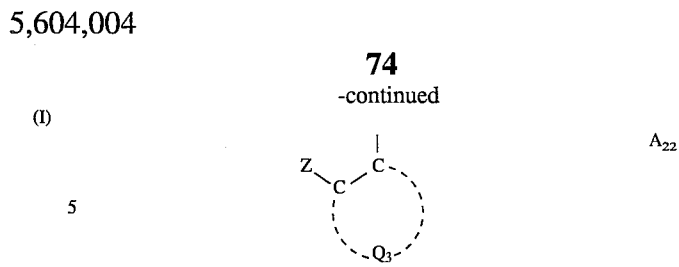

wherein

Q$_2$ is a group of atoms necessary to form with C and N a nine or ten-membered heteroaromatic ring which may have a fused ring, Q$_3$ is a group of atoms necessary to form with C a five or six-membered heteroaromatic ring or benzene ring which may have a fused ring, Z is selected from the group consisting of an oxy (—O—), thio (—S—), imino (—NH—), oxycarbonyl (—O—CO—), iminocarbonyl (—NH—CO—), and iminosulfonyl (—NH—SO$_2$—) group, each of A$_1$, A$_{21}$ and A$_{22}$ at its C is attached to N in the formazan skeleton, each of A$_1$ and A$_{22}$ at its N coordinates to M, and A$_{22}$ at its Z coordinates to M, Y is selected from the group consisting of an aromatic, alkyl, acyl, alkoxycarbonyl, cyano, nitro, alkoxy and alkylthio group, R$_1$, R$_2$, R$_3$, R$_4$, and R$_5$ are independently selected from the group consisting of a hydrogen atom, alkyl group, alkoxy group, nitro group, cyano group, halogen atom, aryl group, aryloxy group, acyl group, alkoxycarbonyl group, carbamoyl group, and amino group, at least one of R$_4$ and R$_5$ is a hydrogen atom, n representing the number of formazan ligands coordinating to M is equal to 1 or 2, X is a counter ion to the formazan metal complex, k is a number necessary to provide a balance of electric charge, and the broken lines in formulae (I) and (II) represent coordinate bonds to M.

\* \* \* \* \*

UNITED STATES PATENT AND TRADEMARK OFFICE
CERTIFICATE OF CORRECTION

PATENT NO. : 5,604,004
DATED : February 18, 1997
INVENTOR(S) : Takahiko SUZUKI ET AL It is certified that error appears in the above-identified patent and that said Letters Patent is hereby corrected as shown below:

Column 72, claim 7, "The optical recording medium of any one of claims 1 to wherein said recording layer further contains a light absorbing dye." should read --An optical recording medium having a recording layer comprising at least one dye selected from formazan metal complex dyes of the following general formula (III):

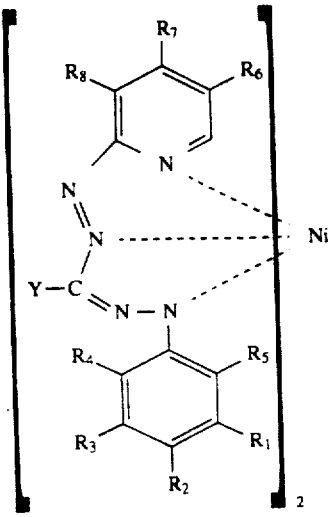

(III)

UNITED STATES PATENT AND TRADEMARK OFFICE
CERTIFICATE OF CORRECTION

PATENT NO. : 5,604,004
DATED : February 18, 1997
INVENTOR(S) : Takahiko SUZUKI ET AL It is certified that error appears in the above-identified patent and that said Letters Patent is hereby corrected as shown below:

wherein Y is selected from the group consisting of an aromatic, alkyl, acyl, alkoxycarbonyl, cyano, nitro, alkoxy and alkylthio group, $R_1$, $R_2$, $R_3$, $R_4$, and $R_5$ are independently selected from the group consisting of a hydrogen atom, alkyl group, alkoxy group, nitro group, cyano group, halogen atom, aryl group, aryloxy group, acyl group, alkoxycarbonyl group, carbamoyl group, and amino group, at least one of $R_4$ and $R_5$ is a hydrogen atom, $R_6$, $R_7$, and $R_8$ are independently selected from the group consisting of a hydrogen atom, halogen atom, nitro group, alkyl group, and cyano group, and the broken lines in formula (III) represent coordinate bonds to Ni.--

UNITED STATES PATENT AND TRADEMARK OFFICE
CERTIFICATE OF CORRECTION

PATENT NO. : 5,604,004
DATED : February 18, 1997
INVENTOR(S) : Takahiko SUZUKI ET AL It is certified that error appears in the above-identified patent and that said Letters Patent is hereby corrected as shown below:

Column 72, claim 8, "The optical recording medium of claim 7 wherein said light absorbing dye is a cyanine dye." should read --The optical recording medium of any one of claims 1 to 7 wherein said recording layer further contains a light absorbing dye.--

Column 72, claim 9, "An optical recording medium having a recording layer comprising at least one dye selected from formazan metal complex dyes of the following general formula (III):

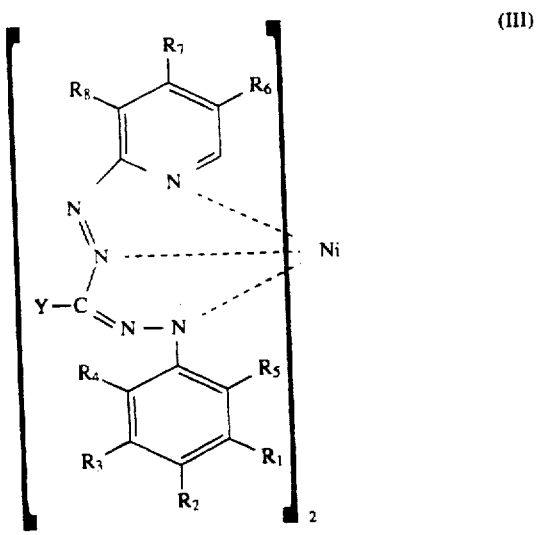

UNITED STATES PATENT AND TRADEMARK OFFICE
CERTIFICATE OF CORRECTION

PATENT NO. : 5,604,004
DATED : February 18, 1997
INVENTOR(S) : Takahiko SUZUKI ET AL It is certified that error appears in the above-identified patent and that said Letters Patent is hereby corrected as shown below:

wherein Y is selected from the group consisting of an aromatic, alkyl, acyl, alkoxycarbonyl, cyano, nitro, alkoxy and alkylthio group, $R_1$, $R_2$, $R_3$, $R_4$, and $R_5$ are independently selected from the group consisting of a hydrogen atom, alkyl group, alkoxy group, nitro group, cyano group, halogen atom, aryl group, aryloxy group, acyl group, alkoxycarbonyl group, carbamoyl group, and amino group, at least one of $R_4$ and $R_5$ is a hydrogen atom, $R_6$, $R_7$, and $R_8$ are independently selected from the group consisting of a hydrogen atom, halogen atom, nitro group, alkyl group, and cyano group, and the broken lines in formula (III) represent coordinate bonds to Ni." should read --The optical recording medium of claim 8 wherein said light absorbing dye is a cyanine dye.--

UNITED STATES PATENT AND TRADEMARK OFFICE
CERTIFICATE OF CORRECTION

PATENT NO. : 5,604,004
DATED : February 18, 1997
INVENTOR(S) : Takahiko SUZUKI ET AL It is certified that error appears in the above-identified patent and that said Letters Patent is hereby corrected as shown below:

Column 74, line 21, "CO-," should read --CO-),--;

line 25, "...each of $A_1$ and $A_{22}$" should read --each of $A_1$ and $A_{21}$--.

Signed and Sealed this

Twelfth Day of May, 1998

Attest:

BRUCE LEHMAN

Attesting Officer

Commissioner of Patents and Trademarks